(12) United States Patent
Namba et al.

(10) Patent No.: US 7,022,014 B2
(45) Date of Patent: Apr. 4, 2006

(54) BASEBALL GAME PROGRAM, COMPUTER-READABLE RECORDING MEDIUM, AND METHOD SUITED FOR USE WITH PERSONAL COMPUTERS

(75) Inventors: Kazuhiro Namba, Amagasaki (JP); Tatsuya Ishikawa, Takarazuka (JP); Hidehisa Takahashi, Amagasaki (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 58 days.

(21) Appl. No.: 10/055,672

(22) Filed: Jan. 23, 2002

(65) Prior Publication Data

US 2002/0103016 A1    Aug. 1, 2002

(30) Foreign Application Priority Data

Feb. 1, 2001    (JP) .............................. 2001-025989

(51) Int. Cl.
*A63F 13/06*    (2006.01)

(52) U.S. Cl. .............................. 463/4; 463/7; 345/163
(58) Field of Classification Search ............... 463/1–4, 463/7, 30–33, 36–38, 42; 273/148 B, 459–461; 345/156–163
See application file for complete search history.

(56) References Cited

U.S. PATENT DOCUMENTS 5,435,554 A * 7/1995 Lipson ........................ 463/3

(Continued)

FOREIGN PATENT DOCUMENTS

EP    0 916 376    5/1999

(Continued)

OTHER PUBLICATIONS

Triple Play Baseball Manual. 2000. EA Sports, Redwood City, CA.*

(Continued)

*Primary Examiner*—Scott Jones
(74) *Attorney, Agent, or Firm*—Jordan and Hamburg LLP

(57) ABSTRACT

An object of the present invention is to realize a baseball game in an environment that is difficult to achieve with game-dedicated devices and the joystick used in such devices. When the mouse 22 is moved toward region A, the position (height) of the bat character is raised from the current position. When the mouse 22 is moved toward region B, the position (height) of the bat character is lowered from the current position. When the mouse 22 is moved toward region C, the direction of the bunt is moved toward the left side from the current direction. When the mouse 22 is moved toward region D, the direction of the bunt is moved toward the right side from the current direction.

20 Claims, 19 Drawing Sheets

U.S. PATENT DOCUMENTS

| | | |
|---|---|---|
| 5,601,487 A | 2/1997 | Oshima et al. |
| 5,769,713 A | 6/1998 | Katayama |
| 6,045,446 A | 4/2000 | Ohshima |
| 6,120,374 A | 9/2000 | Akada et al. |
| 6,257,983 B1 | 7/2001 | Rimoto |
| 6,270,413 B1* | 8/2001 | Aikawa et al. ............ 463/31 |
| 6,292,706 B1* | 9/2001 | Birch et al. ............ 700/91 |
| 6,334,813 B1 | 1/2002 | Rimoto et al. |
| 6,340,332 B1 | 1/2002 | Rimoto et al. |
| 6,368,210 B1* | 4/2002 | Toyohara et al. ............ 463/3 |
| 6,394,894 B1* | 5/2002 | Okitsu et al. ............ 463/3 |
| 6,398,647 B1* | 6/2002 | Hirai et al. ............ 463/31 |
| 6,482,090 B1 | 11/2002 | Rimoto et al. |
| 6,527,637 B1* | 3/2003 | Fujioka et al. ............ 463/4 |
| 2001/0005689 A1* | 6/2001 | Fujioka et al. ............ 463/4 |
| 2001/0006908 A1* | 7/2001 | Fujioka et al. ............ 463/3 |
| 2001/0008846 A1 | 7/2001 | Yamauchi et al. |
| 2002/0107058 A1 | 8/2002 | Namba et al. |
| 2003/0017863 A1 | 1/2003 | Takahashi et al. |
| 2003/0022707 A1 | 1/2003 | Namba et al. |

FOREIGN PATENT DOCUMENTS

| | | |
|---|---|---|
| EP | 1 072 299 | 1/2001 |

OTHER PUBLICATIONS

Triple Play 2001 Baseball Manual. 2001. EA Sports, Redwood City, CA.*

Pages 6, 14 and 15 of "1997 opening game version of powerful professional baseball game in the real situation, official perfect guidance book", Konami Corporation, newly revised on Apr. 1, 1998.

Mar. 31, 1999 FKrueger "Triple Play 2000" Game Over Online Magazine. [online]. Mar. 31, 1999, retrieved on Jun. 1, 2005. Retrieved from the Internet: <URL: http://www.game-over.net/reviews.php?id=130&page=reviews>. FKrueger.

Mar. 8, 1999 "Triple Play 2000" PC Games: Triple Play 200 by Electronic Arts. [online]. Mar. 8, 1999, [retrieved on Nov. 18, 2004]. Retrieved from the Internet: <URL: http:pc.ign.com/articles/131/131249p1.html?whreFrom=login>.

* cited by examiner

BASEBALL GAME PROGRAM, COMPUTER-READABLE RECORDING MEDIUM, AND METHOD SUITED FOR USE WITH PERSONAL COMPUTERS

BACKGROUND OF THE INVENTION

1. Field of the Invention

The present invention relates to a game progress control program, a computer readable recording medium recording the game progress control program, a game server and a game progress control method.

2. Description of the Related Art

In recent years, the playing of competitive games such as tennis, soccer, baseball and the like on the monitors of programmed computers has been widely practiced. The content of the competition varies; however, in almost all of these games, the game player (hereinafter also referred to as a player) ordinarily controls the actions of a player character using an operating unit, and the player is given a score on the basis of how appropriately the player character acts with respect to a ball put into play by the computer device or by a competitor character operated by a competitor. For example, in the case of a baseball game, the criterion for assigning a score is how skillfully a batter character constituting the player character hits back a ball pitched by a pitcher character constituting the competitor character.

The content of the operations performed by the player in this case comprises mainly the determination of the position and attitude of the batter character, the selection or adjustment of the type of bat, and the swinging timing, swinging position and swinging angle of the bat or the like. Ordinarily, an operating unit connected to the computer device proper is used in order to realize such operations. This operating unit is generally arranged so that arbitrary coordinate positions in two dimensions are specified by detecting the amounts of displacement of the player's operation in the direction of the X coordinate and the direction of the Y coordinate, and the specified coordinate positions are transmitted to the computer device proper. The position of the batter character and the like are realized by specifying such coordinate positions. Furthermore, the system is arranged so that timing signals are generated by pressing a switch at arbitrary points in time, and these timing signals are transmitted to the computer device proper. The swinging timing of the bat is determined by such timing signals.

Computer devices can be divided into two main categories, i. e., computer devices specifically devised for game use, such as game-dedicated devices, and computer devices that can be used in a broad range of applications, such as personal computers. In the case of the former devices, an analog joystick or digital joystick, or a controller mounting such joystick, is used as the operating unit. In an analog joystick, sensors that output the X coordinate and Y coordinate as analog values are disposed in the base end part of a projecting body of a specified size. By tilting this projecting body with the fingers, the player can designate arbitrary coordinate positions in a two-dimensional region in accordance with the amount of inclination. Furthermore, in the case of digital joystick, a cross-shape key which has sensors (or switches) that are used to produce coordinates in the upward, downward, left and right directions constitutes the mainstream; in this case, the player can designate arbitrary coordinate positions in a two-dimensional region by continuing to press one cross-shape key, or by continuing to press two cross-shape keys simultaneously.

On the other hand, a pointing device such as a mouse, portable tracking ball, portable slide pad or the like is generally used as the operating unit of a personal computer. Among these pointing devices, both a mouse and a portable tracking ball have a pair of sensors which detect the respective amounts of displacement of the X coordinate and the Y coordinate, and a ball body which is used to drive both sensors simultaneously; these devices are arranged so that coordinate positions in a two-dimensional region can be designated by the player rolling the ball body in the target direction, either directly with the hand or indirectly via a disk surface. A slide pad has a contact position for human fingers and a sensor, which detects the direction of movement and amount of movement; such a slide pad is arranged so that arbitrary coordinate positions in a two-dimensional region can be designated on the basis of the detection results of the sensor. In principle, a combination with a mouse or the like can be realized by a digital method.

The main difference between the operating unit of a game-dedicated device and that of a personal computer lies in the handling of the pointer. Specifically, in the case of a game-dedicated device, data corresponding to the pointer (hereafter referred to as a "virtual pointer") is present inside the device. Since this virtual pointer is displaced as long as the player continues to press the projecting body or cross-shape keys, the virtual pointer is a tool that is superior to a mouse or the like in terms of operability in cases where the pointer is merely displaced by an approximate amount in the desired direction and quickly returned to the home position. However, data that is input by means of a joystick is only data that relates to the direction of displacement; the amount of displacement of the virtual pointer depends exclusively on the input time. On the other hand, data that is input by means of a mouse or the like is data that relates to the direction of displacement and amount of displacement, so that the direction of displacement and amount of displacement of the pointer can be input in a single operation regardless of the length of the input time. Accordingly, in the case of application to games which require displacement of the pointer to random positions at a high speed, and subsequent actions at the displaced position, it may be said that a mouse or the like is superior to the respective joysticks.

Currently, game-dedicated devices are more the mainstream of computer devices used for games than personal computers, and game programs also have a content that envisions operation by the operating unit of a game-dedicated device. In the case of game-dedicated devices, however, it is difficult to realize a game, which requires accurate displacement of the pointer to random positions at a high speed and subsequent actions at the displaced position as described above. Furthermore, in the case of game-dedicated devices, only the person who purchases the device can play the game; this hinders the realization of a game that allows wide participation by numerous persons. On the other hand, all-purpose computer devices such as personal computers have a wide user stratum, and also allow a wider range of utilization than game-dedicated devices in terms of communications infrastructure such as networks.

SUMMARY OF THE INVENTION

Accordingly, an object of the present invention is to provide a game progress control program, a computer-readable recording medium, a game server and a game progress control method which allow the realization of a baseball game in an environment that is difficult to achieve in the case of game-dedicated devices and joysticks used in such devices.

In order to achieve the above object, according to one aspect of the present invention, this invention relates to a computer readable recording medium in which a game progress control program is recorded to control a progress of a baseball game in which a game player's team and a computer-controlled team or competitor's team alternately play offense and defense via a ball character used as a game medium. Said game progress control program comprising the steps of: displaying a game image including a plurality of characters on a monitor screen of a computer; receiving input of contents of instructions based on a moving operation and a button operation made by the game player on a pointing device; and proceeding a baseball game based on the input made by the game player; wherein in said receiving step, the designation of instructions for the pitching action of a pitcher character is accomplished by the operation of said pointing device when the game player's team is the defensive side, designation of instructions for the offensive action of a batter character is accomplished by the operation of said pointing device when the game player's team is the offensive side, and a selection of bunting or hitting as said offensive action is accomplished by a button operation of said pointing device.

In the abovementioned inventions, the game proceeds with the player's team and the computer-controlled team or competitor's team alternately playing offense and defense via a ball character used as the game medium. When the game player's team is the defensive side, the pitching action of the pitcher character is accomplished by operating the abovementioned pointing device, and when the game player's team is the offensive side, the offensive action of the batter character is accomplished by operating the abovementioned pointing device. Accordingly, a baseball game can be realized in an environment that is difficult to achieve in the case of a game-dedicated device and joystick used in such a device. Furthermore, since the selection of bunting or hitting as the abovementioned offensive action is accomplished by operating the button of the abovementioned pointing device, the offensive action is diversified so that the ability to plan the game is improved.

These and other objects, features and advantages of the present invention will become more apparent upon reading the following detailed description along with the accompanied drawings.

DESCRIPTION OF THE PREFERRED EMBODIMENTS

Figure 1:
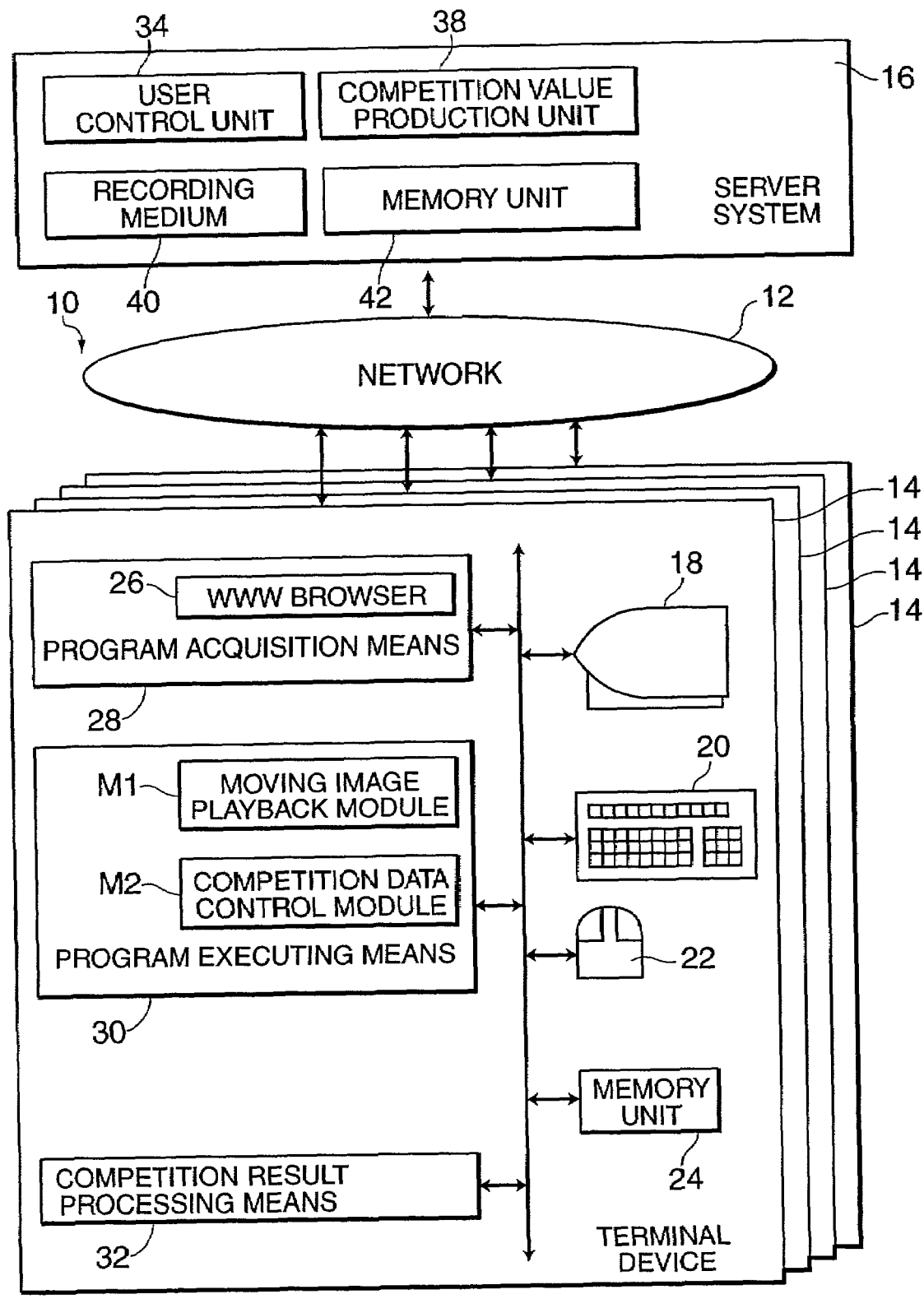
FIG. 1 is a structural diagram of a game system to which a game progress control method constituting one embodiment of the present invention has been applied.

FIG. 1 is a structural diagram of a game system 10 to which a game progress control method constituting one embodiment of the present invention has been applied. In this figure, the game system 10 is constructed so that this system includes a plurality of personal computers 14 which are terminal devices that are connected to Internet 12 (i,e., as being indicative of a type of network), and a server system 16. Furthermore, in the present embodiment, a case is described in which the present invention is applied to a baseball game which is a competitive game that is performed with game players (also referred to as players) using the personal computers 14 (hereafter referred to as "computers 14") participating at arbitrary times via the internet 12.

A display 18, keyboard 20, mouse 22 and memory unit 24 consisting of a RAM or the like is connected to each computer 14; each computer 14 has a net connection tool that allows connection to the internet 12, and a WWW browser 26 is built into each computer 14. In the present embodiment, each computer 14 is equipped with program acquisition means 28, program executing means 30 and competition result processing means 32 in order to realize a baseball game.

The program acquisition means 28 acquire a specified competition program (baseball game program) from a page screen provided by the server system 16 following initial registration with respect to the server system 16, and develop this program in a memory region belonging to the program acquisition means 28. A functional module for program acquisition may be independently prepared; more simply, however, a competition program may be acquired from a page screen of the server system 16 using the function of the WWW browser 26 "as is". Furthermore, the system may be arranged so that this competition program is acquired by the computer 14 from the server system 16 each time that the game is played, or so that the competition program is acquired only at the time of initial registration, and is subsequently stored in the computer 14. Alternatively, a configuration in which the competition program is installed in the computer 14 beforehand may also be used. In this case, there is no need for any program acquisition means 28.

The competition program referred to here is constructed from a moving image playback module M1 and a competition data control module M2. A configuration in which both modules are present in the server system 16 as integral units is desirable; however, a configuration in which the respective modules are dispersed in other server systems may also be used. In the former case, a single URL is noted on the page screen provided by the server system 16, and the system is devised so that the user can automatically acquire all of the modules by designating this URL. In the latter case, URLs for the respective modules are noted on the page screen of the server system 16, and the system is devised so that the user can indirectly acquire all of the modules.

The moving image playback module M1 plays back three-dimensional moving images. For example, "Shock Wave" produced by Micromedia Co., which has become popular on the Internet, can be utilized for this module. The competition data control module M2 controls the original data of the moving images played back by the moving image playback module M1, and various types of data used to develop the story of the competition. In the present embodiment, image data, sound data, text data and the like relating to the pitcher character, batter character, ball character (as one example of a flying object) and shadow, meet cursor (which constitutes the capture point), strike zone, home base and background features such as stands and the like which are necessary in order to realize a baseball game are controlled in accordance with the competition rules. Among the various types of data, at least the image data is controlled so that one display image is formed by a plurality of layers. Specifically, the system is arranged so that the configurations of expressions such as the movements of characters and the like can be varied for each layer. In the case of a control configuration based on such a plurality of layers, an advantage is obtained in that the quantity of original data in the case of moving image playback can be reduced.

The program executing means 30 generate various events relating to a baseball game by executing programs in other modules centering on the program of the competition data control module M2, and produce the results of these events by calculation. In concrete terms, the competition data control module M2 and the like are dropped into the WWW browser 26, and various events are generated by running the programs using the CGI. The display of images and text used for competition is all accomplished on the browser screen, and the transmission of information between the server system 16 and player is all accomplished via the WWW browser 26 and the CGI of the server system 16. The competition result processing means 32 perform processing relating to the results of the baseball game in cooperation with the competition data control module M2 and the like; in concrete terms, these means perform two-way communication with the server system 16, and provide information to the player.

Furthermore, as was described above, the program executing means 30 and competition result processing means 32 can be realized by the computer 14 using the WWW browser 26 and modules acquired from the server system 16; however, it would also be possible to use a configuration in which a program code for realizing all or part of the abovementioned functions is recorded in advance on a conveying medium which can be specified in the form of a "signal" or a recording medium such as a CD-ROM or the like, and this program code is appropriately downloaded (or installed) in the computer 14 before the baseball game is played.

Furthermore, in addition to the basic server function of providing a page screen to the respective computers 14, the server system 16 also has the functions of a user control unit 34 and a competition value production, which is recorded in a form that can be read by the CPU of the server system 16. Furthermore, the server system 16 has a record medium 40 consisting of a CD-ROM, hard disk or the like which stores competition programs and the like that are provided via the internet 12 in response to requests from the player, and a memory unit 42 consisting of a RAM or the like which stores data transmitted from the respective computers 14.

The user control unit 34 controls user-specific information that is accessed via the page screen, and cumulative values and statistical values of the baseball game results, for each player. If necessary, furthermore, this user control unit also has the function of performing a security check for access. The competition value production unit 38 produces incentive information with respect to the baseball game results (number of home runs, batting average, earned run average, number of strike-outs and the like) for each player. Here, the term "incentive information" refers to information, which is used to give the players an incentive for continuing the competition; various types of information are conceivable. Examples of such information include information concerning goods or corresponding value information which is provided to players who satisfy conditions specified by the sponsor of the competition, as well as key words which allow free access to site ordinarily requiring a fee for access or the like. This incentive information can be set in stages. In this case, in the most initial stage, a ranking is made in order to inform a given player how the competitive ability of this player is ranked compared to the competitive abilities of other players, and a specified display of incentives at each stage is performed for this player.

Figure 5:
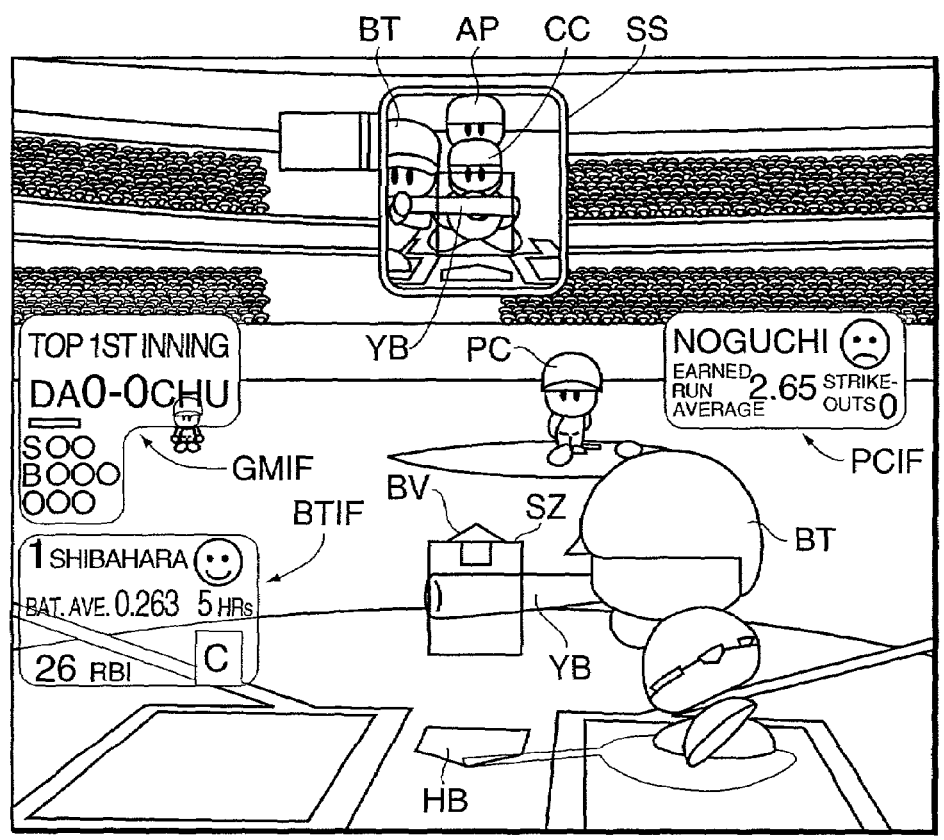
FIG. 5 shows the bunt screen that is displayed on the monitor of the game system.
Figure 6:
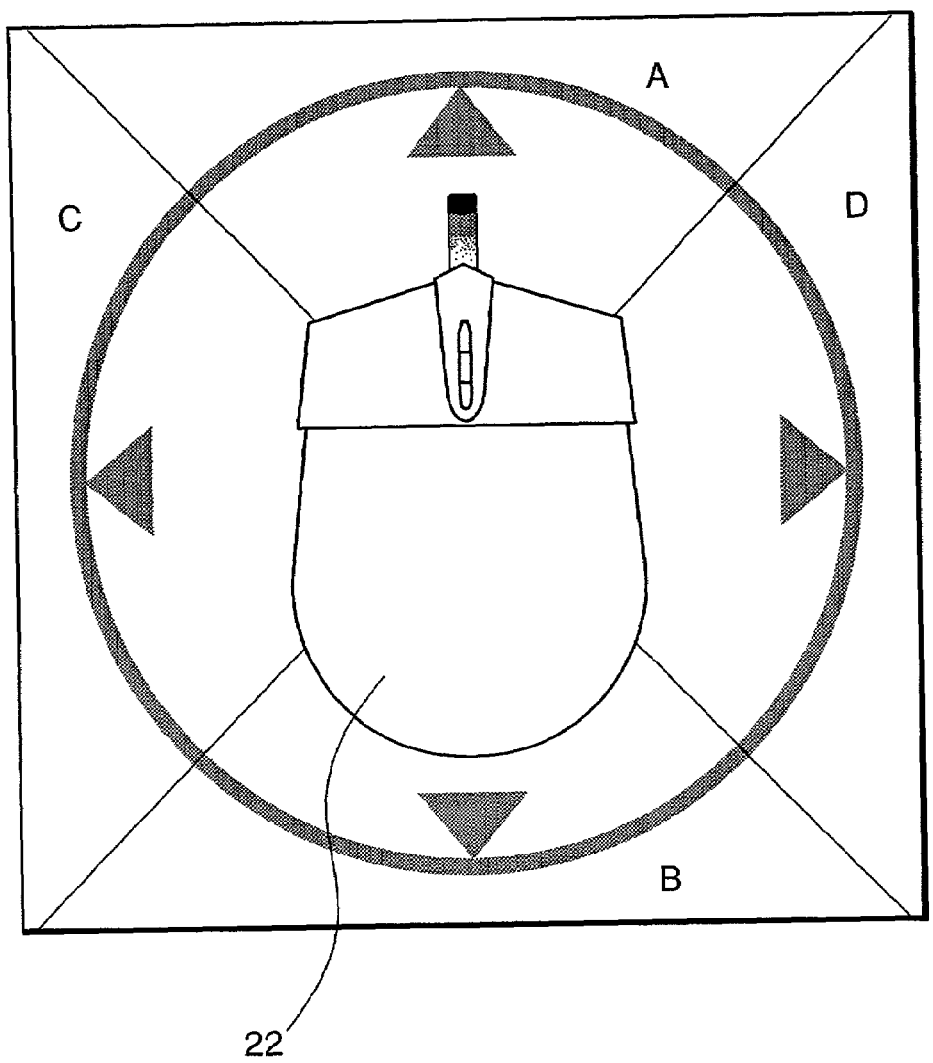
FIG. 6 is an explanatory diagram of the operating method relating to the alteration of the direction of bunting and position (height) of the bat track using the pointing device.

Next, the procedure used in cases where a baseball game is actually played using the abovementioned system will be described on the basis of the flow charts shown in FIGS. 2 and 3, with reference to the explanatory diagram of the operating method of the pointing device such as a mouse or the like shown in FIG. 6, and the display screens shown in FIGS. 4 and 5 and FIGS. 7 through 19. In this baseball game, in the present embodiment, the player's team competes for a maximum of nine innings (i. e., with the same player alternately repeating offense and defense) with a computer-controlled team (hereafter referred to as a "computer team") or the team of another player, and the ranking of the player's team with respect to the teams of other players playing the same baseball game via the internet 12 is determined on the basis of the cumulative value of the winning score of the player's team relative to the computer team (or other player's team) at the point in time at which the game ends. This winning score is the difference between the score of the player's team and the score of the computer team; for example, when the score of the player's team is 5 and the score of the computer team (or other player's team) is 3, the winning score is "+2", while in a case where the score of the player'team is 3 and the score of the computer team (or other player's team) is 5, the winning score is "−2".

Furthermore, in a case where the player's team is the offensive side, the player operates the batting action of the batter using the abovementioned pointing device such as a mouse or the like, and the movements of the runners and the like are automatically processed according to baseball rules.

In a case where the player's team is the defensive side, the player operates the pitching motion of the pitcher using the abovementioned pointing device such as a mouse or the like, and the actions of the other player characters such as outfielders and the like are automatically processed according to baseball rules. Furthermore, the reason that a pointing device such as a mouse or the like is used is that this allows the input of the direction of displacement and amount of displacement of the pointer displayed on the monitor 18 by a single operation, and takes into account the fact that even an inexperienced player can easily displace the pointer to random positions at a high speed, and the fact that such pointing devices have become most popular with players using personal computers. In the following description, a case in which the player's team is the offensive side will be described.

Figure 2:
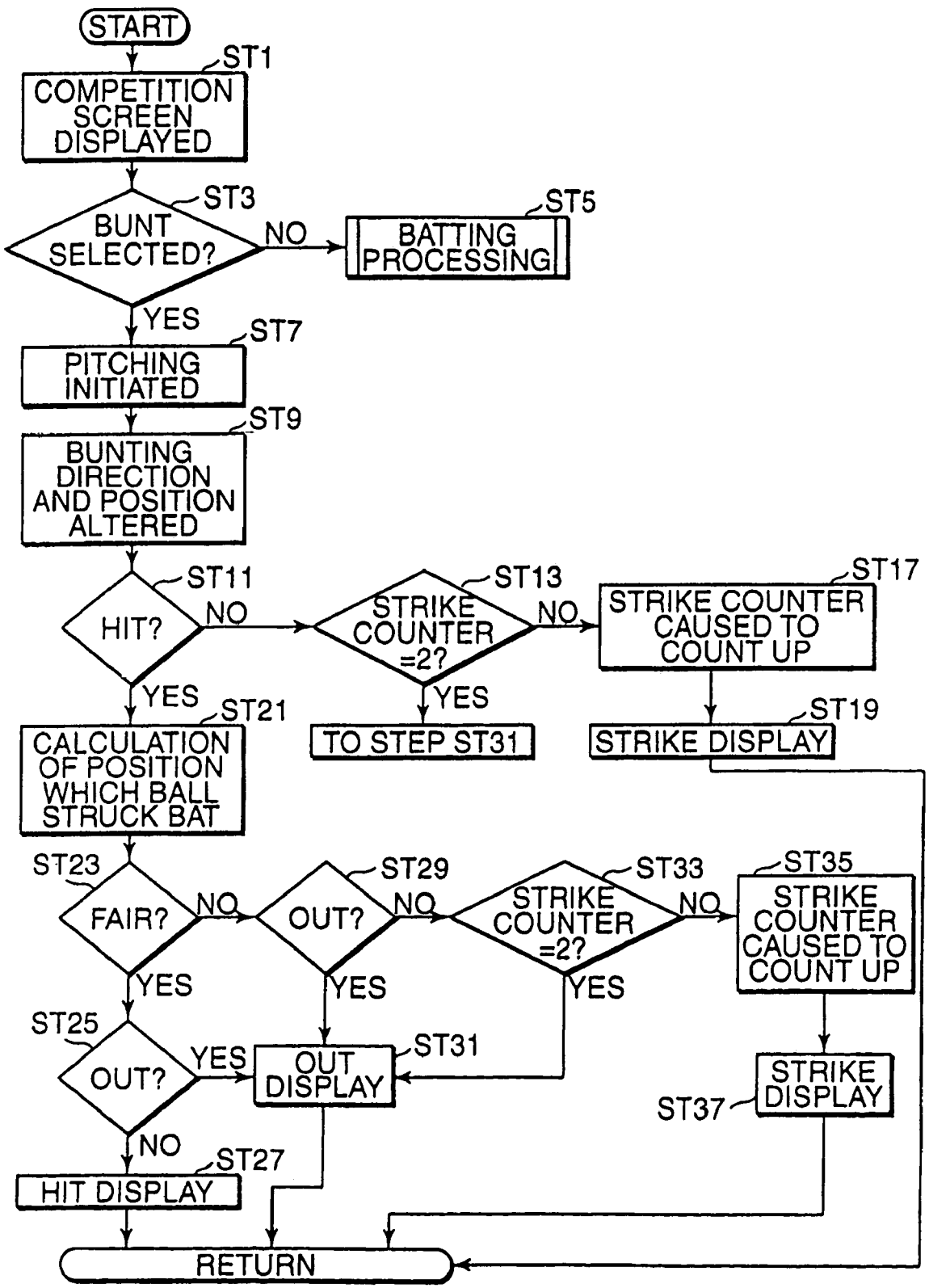
FIG. 2 is a flow chart, which is used to illustrate the operation of the game system.
Figure 4:
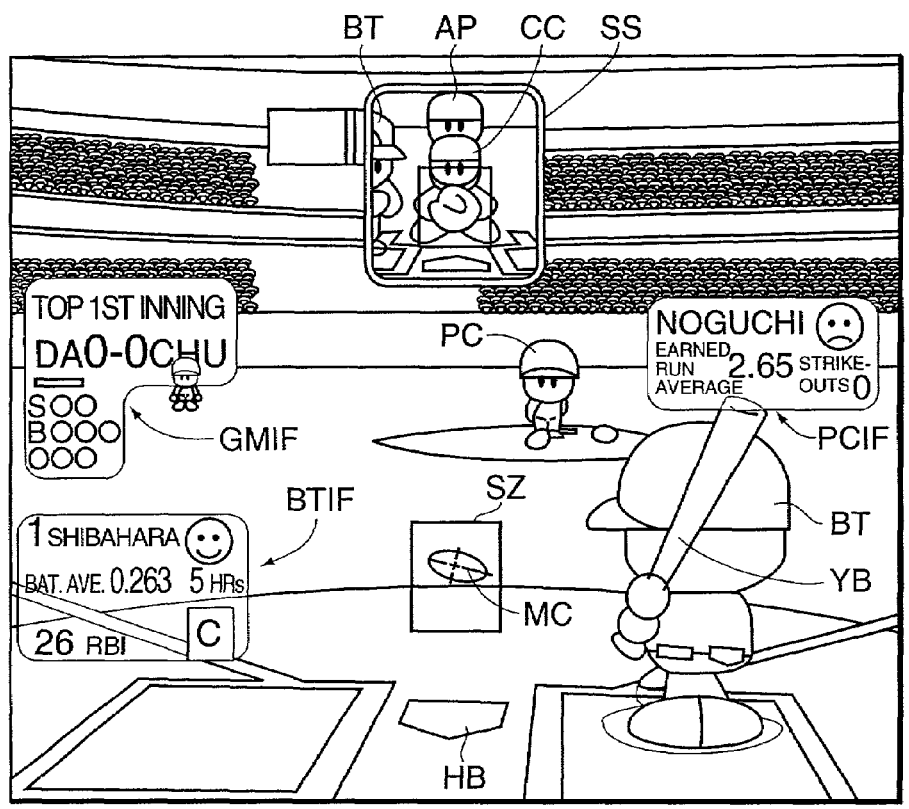
FIG. 4 shows the competition screen that is displayed on the monitor of the game system.

In the flow chart shown in FIG. 2, a competition screen such as that shown in FIG. 4 is first displayed on the monitor 18 (ST1). In this competition screen shown in FIG. 4, the pitcher character PC of the computer team (or other player's team) is displayed in the center of the screen, and the batter character BT of the player's team, who grips a bat character YB, is shown on the batter's box. Furthermore, a strike zone SZ is displayed above home base HB, and a meet cursor MC, which is operated by the player is also displayed. Moreover, a small screen SS, which shows the side of the batter character BT as seen from the side of the pitcher character PC is displayed in the upper central portion of the screen. The batter character BT, an umpire character AP and a catcher character CC are displayed in this small screen SS. Furthermore, the name, earned run average and the like of the pitcher character, which constitute information PCIF concerning the pitcher character PC, are displayed to the right of the pitcher character PC. Moreover, the name, batting average and the like of the batter character BT, which constitute information PCIF concerning the batter character BT, are displayed on the lower left portion of the screen. The strike count, ball count, out count and the like, which constitute information GMIF concerning the game currently being played, are displayed on the left central portion of the screen. Furthermore, the strike count, ball count and out count are respective counted by a strike counter, ball counter and out counter.

Next, the selection of bunting or hitting is performed by the player using the pointing device such as a mouse or the like (ST3). For example, in a case where the player continues to press the left and right buttons of the mouse simultaneously (referred to as the "both-pressed state"), bunting is selected; in other cases, hitting is selected. When bunting is selected, a bunt screen such as that shown in FIG. 5 is displayed on the monitor 18, and the pitcher character PC initiates the pitching action (ST7). The batter character BT holding the bat character YB above home base HB is displayed on the bunt screen shown in FIG. 5, and the direction of bunt within the range extending from third base to first base is displayed as the direction of the arrow BV above the bat character YB. Furthermore, at the point in time at which the bunt screen is displayed, the bat character YB is positioned in the center position (with respect to the vertical direction) of the strike zone SZ, and the arrow BV is pointed in the direction of the pitcher character.

Next, the alteration of the bunting direction and position (height) of the bat character YB is performed by the player using the abovementioned pointing device such as a mouse or the like (ST9). FIG. 6 is an explanatory diagram of the operating method used to alter the direction of bunting and the position (height) of the bat character YB by means of the pointing device. FIG. 6 shows a view of the mouse 22 seen from directly above; the mouse 22 is depicted in the center of the figure. The mouse 22 can be moved in any direction on the plane on which the mouse is placed; this plane is divided into four parts, i. e., region A, region B, region C and region D.

Figure 7:
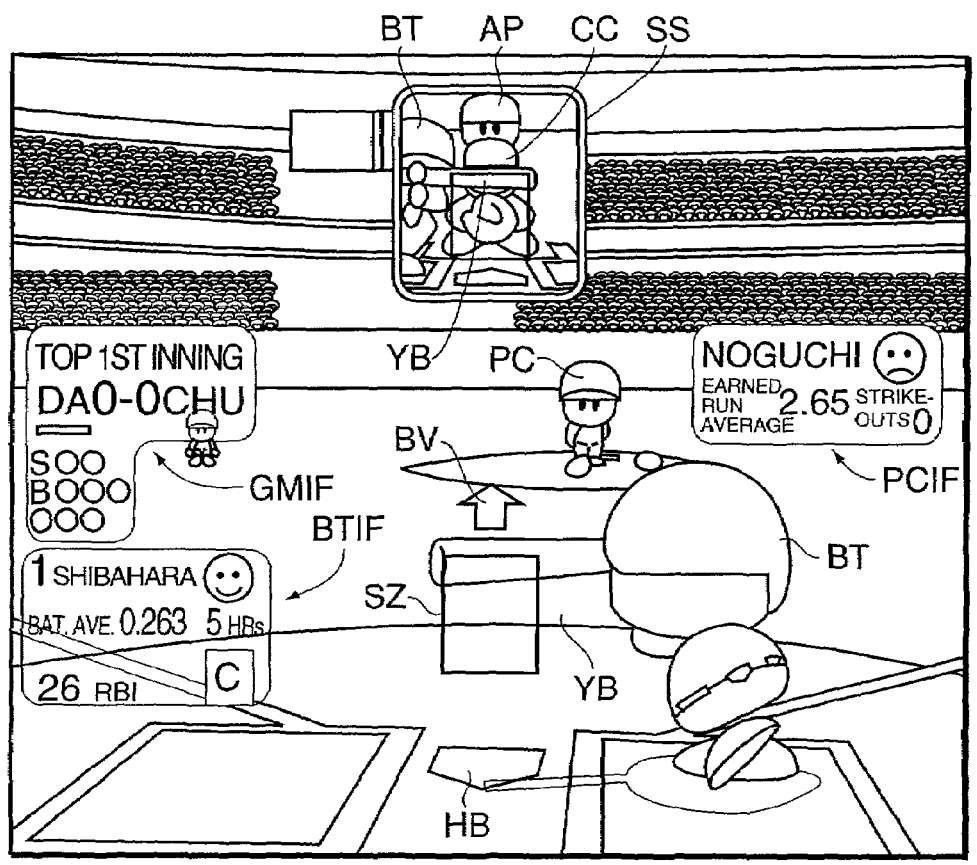
FIG. 7 shows the bunt screen that is displayed on the monitor of the game system.
Figure 8:
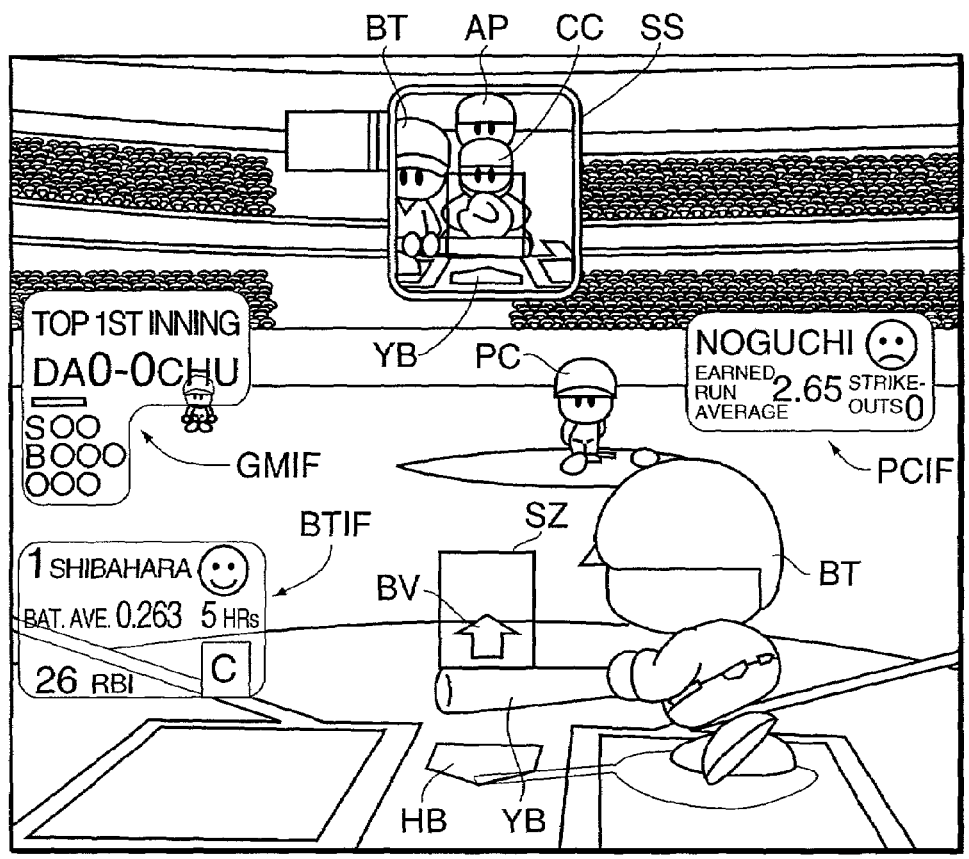
FIG. 8 shows the bunt screen that is displayed on the monitor of the game system.

When the mouse 22 is moved toward region A, the position (height) of the bat character YB is raised from the current position. FIG. 7 shows the screen that is displayed as a result of the abovementioned operation; here, the bat character YB is displayed at the upper end of the strike zone SZ. When the mouse 22 is moved toward region B, the position (height) of the bat character YB is lowered from the current position. FIG. 8 shows the screen that is displayed as a result of the abovementioned operation; here, the bat character YB is displayed at the lower end of the strike zone SZ. Here, furthermore, the bat character YB can be moved from the lower end to the upper end of the strike zone SZ; for example, in cases where the mouse 22 is moved toward region A when the bat character YB is at the upper end of the strike zone SZ, the bat character YB does not move. Furthermore, the speed at which the bat character YB moves through the screen is proportional to the speed at which the mouse 22 moves. Specifically, in cases where the mouse 22 is moved quickly, the bat character YB is moved quickly through the screen.

Figure 9:
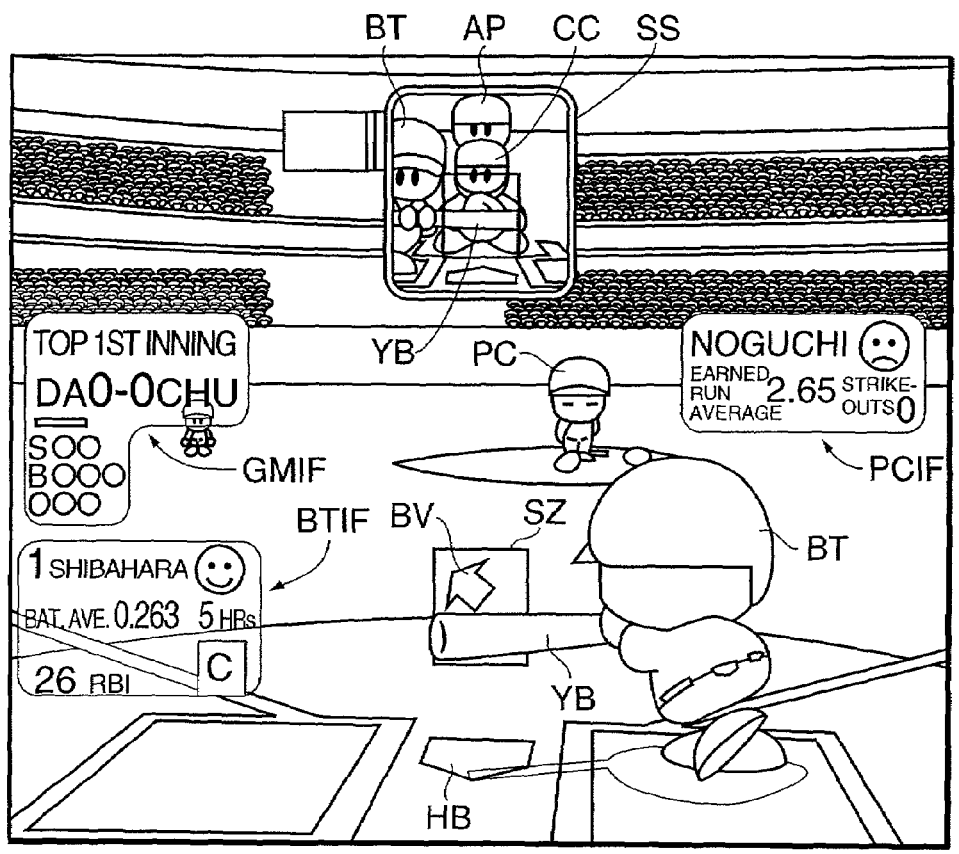
FIG. 9 shows the bunt screen that is displayed on the monitor of the game system.
Figure 10:
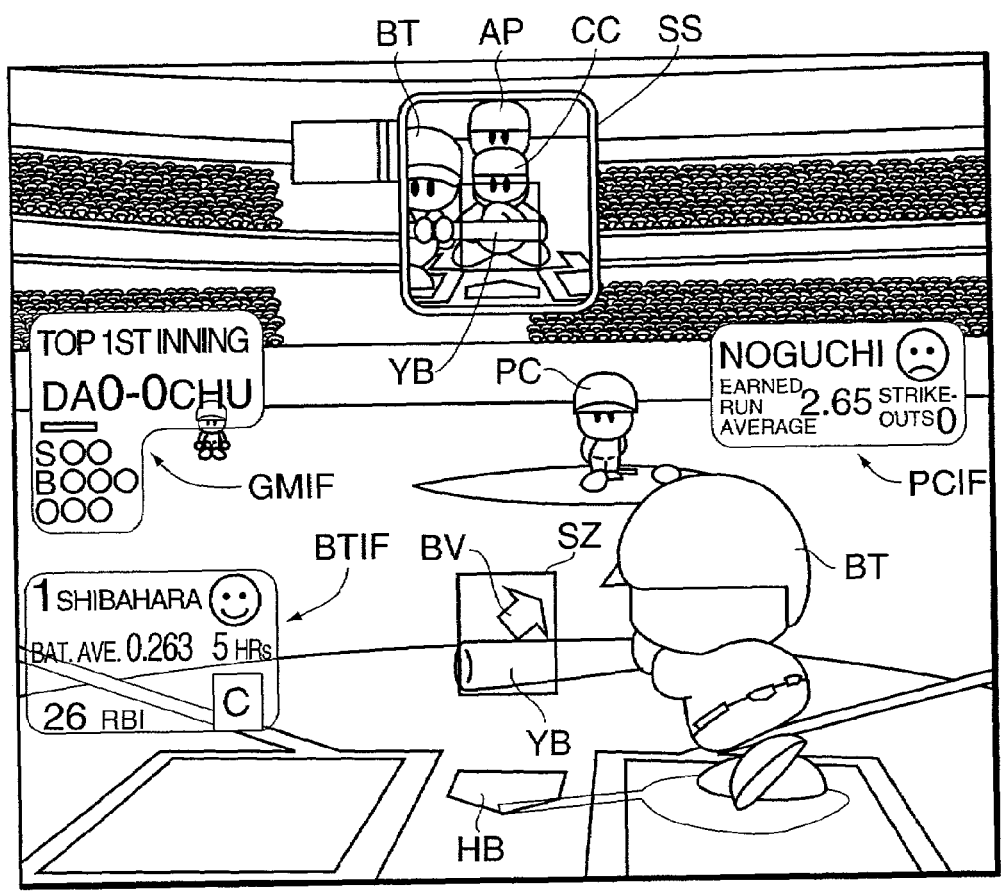
FIG. 10 shows the bunt screen that is displayed on the monitor of the game system.

When the mouse 22 is moved toward region C, the direction of the bunt is moved toward the left side from the current direction. FIG. 9 shows the screen that is displayed as a result of the abovementioned operation; here, the arrow BV that indicates the direction of the bunt is displayed pointing toward the upper left. When the mouse 22 is moved toward region D, the direction of the bunt is moved toward the right side from the current direction. FIG. 10 shows the screen that is displayed as a result of the abovementioned operation; here, the arrow BV that indicates the direction of the bunt is displayed pointing toward the upper right. Furthermore, the orientation of the arrow BV that indicates the direction of the bunt can be varied from a specified portion of the foul zone on the third base side to a specified portion of the foul zone on the first base side on either side of the fair zone. For example, when the mouse 22 is moved toward region C in a case where the arrow BV is oriented toward the abovementioned specified portion of the foul zone on the third base side, the arrow BV does not move. Furthermore, the speed at which the orientation of the arrow BV within the screen is altered is proportional to the speed at which the mouse 22 moves. Specifically, in cases where the mouse 22 is moved quickly, the orientation of the arrow BV is also quickly altered through the screen.

Next, a "hit" of the ball character BA and bat character YB is judged by the timing at which the ball character BA (omitted from the figures) thrown by the pitcher character PC passes over home base HB (ST11). The judgment of this "hits" is accomplished by comparing the height at which the ball character BA passes over home base HB and the height of the axial center of the bat character YB. Specifically, in cases where the distance between the center of the ball character BA and the axial center of the bat character YB is equal to or greater than a specified value, the batting action is judged to be a "strike" (i. e., not a "hit"); on the other hand, in cases where the distance between the center of the ball character BA and the axial center of the bat character YB is less than the abovementioned specified value, the batting action is judged to be a "hit".

Figure 11:
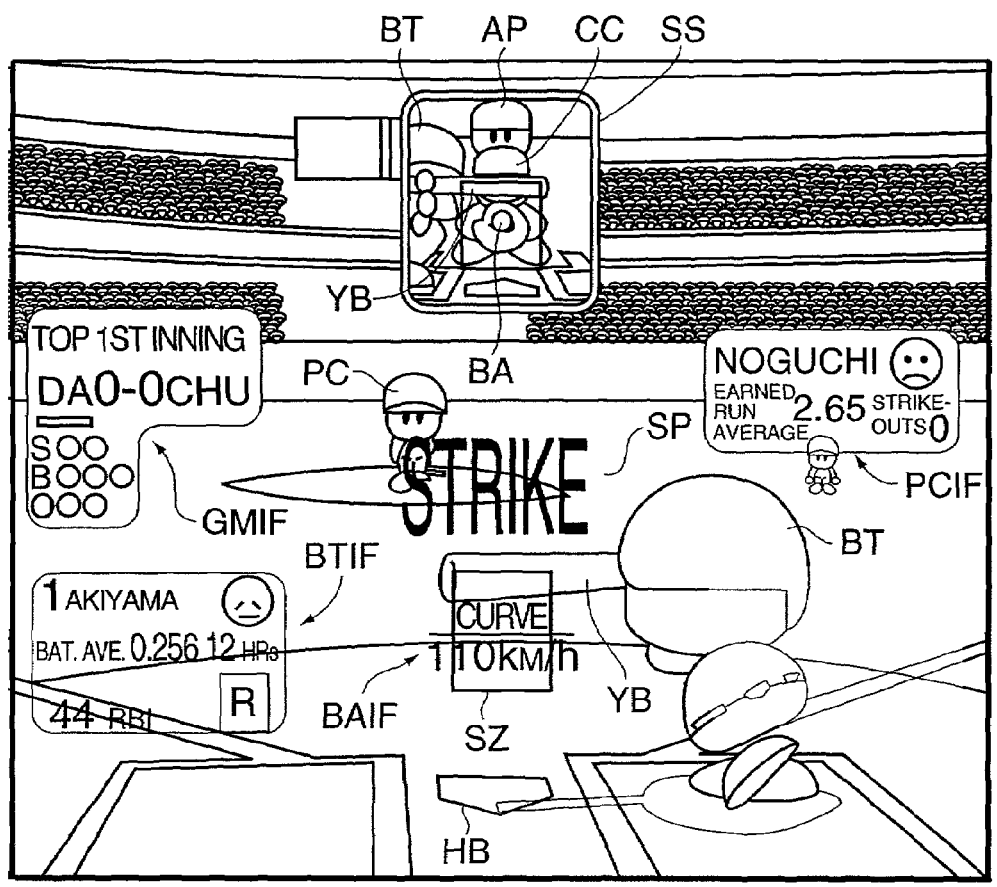
FIG. 11 shows the strike screen that is displayed on the monitor of the game system.

In cases where it is judged that the batting action is not a "hit" in step ST11, a judgment is made as to whether or not the current count of the strike counter is "2" (ST13). In cases where the count of the strike counter is "2", the process proceeds to step S31. In cases where the count of the strike counter is not "2", the strike counter is caused to count up ("1" is added) (ST17), and the strike screen shown in FIG. 11 is displayed (ST19), after which the processing is returned. In the strike screen, a strike display SP indicating that the current result was a "strike" is displayed in the center of the screen, and the type and speed of the ball pitched by the current pitcher character are displayed in pitching content display part BAIF inside the strike zone SZ.

In cases where it is judged that the batting action is a "hit" is step ST11, a calculation of whether the motion of the ball character BA striking the bat character YB is a flying motion (fly) or rolling motion (grounder), and a calculation of the direction of the flying (or rolling) motion, are performed on the basis of the height at which the ball character BA passes over home base HB, the height of the axial center of the bat character YB, and the orientation of the arrow BV indicating the direction of the bunt (ST21). In concrete terms, for example, in cases where the distance between the center of the ball character BA and the axial center of the bat character YB is less than a specified value, and center of the ball character BA is higher than the axial center of the bat character YB, the hit is judged to be a "fly", while in cases where the distance between the center of the ball character BA and the axial center of the bat character YB is less than the abovementioned specified value, and center of the ball character BA coincides with the axial center of the bat character YB or is lower than the axial center of the bat character YB, the hit is judged to be a "grounder".

Figure 12:
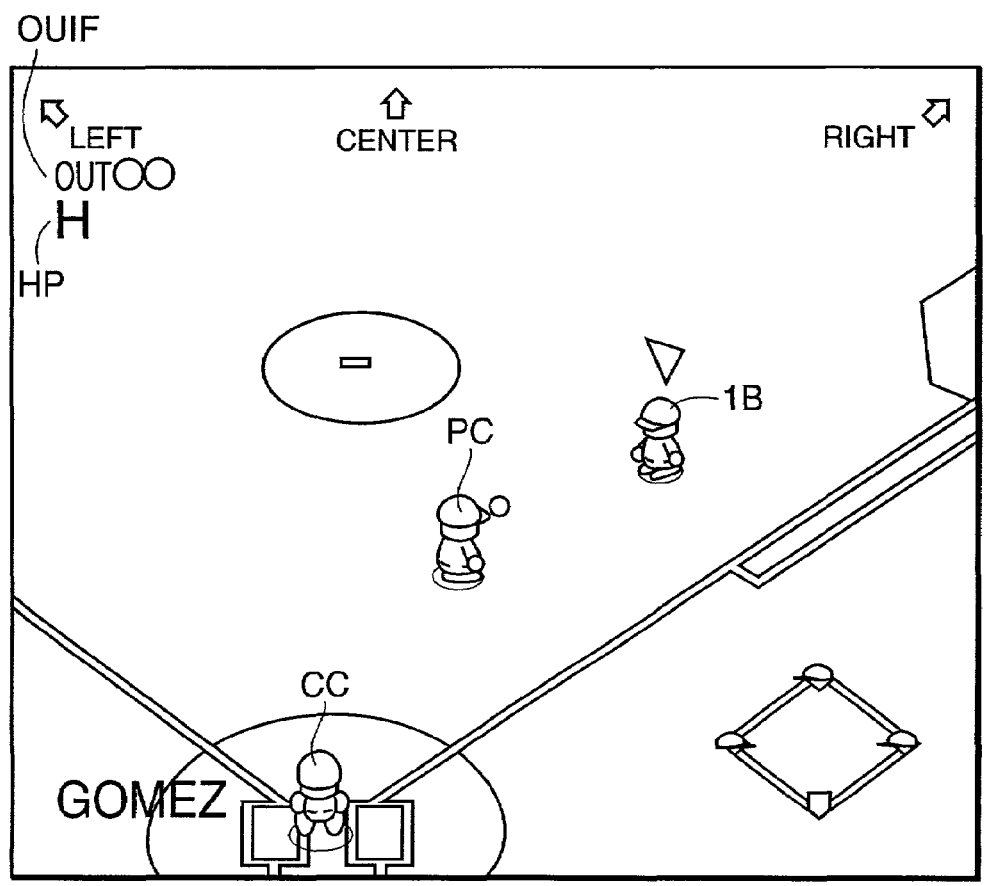
FIG. 12 shows the hit screen that is displayed on the monitor of the game system.

Next, a judgment is made from the direction of the flying motion (or rolling motion) of the ball character BA calculated in step ST21 as to whether or not the hit is "fair" (ST23). Furthermore, the judgment that is performed in step ST23 as to whether or not the hit is "fair" is accomplished by utilizing a comparison of coordinates indicating the ground of the game, which has boundary lines between the "fair ground" and "foul ground" with the direction of the flying motion (or rolling motion) of the ball character BA. In cases where a judgment of "fair" is made in step ST23, a judgment as to whether or not the hit is an "out" is made on the basis of the movement of the ball character BA, defensive positions and the like (ST25). Furthermore, a configuration in which the ability parameters of the batter character BT affect the judgment as to whether or not the hit is an "out" may also be used. In cases where it is judged in step ST25 that the hit is not an "out", the hit screen shown in FIG. 12 is displayed (ST27), and the processing is returned. In the hit screen, a hit display HP indicating that the current result was a "hit" is displayed on the upper left portion of the screen, and the current out count is displayed in an out count display part OUIF above the display HP. On the other hand, in cases where a judgment of "out" is made in step ST25, the processing proceeds to step ST31.

Figure 13:
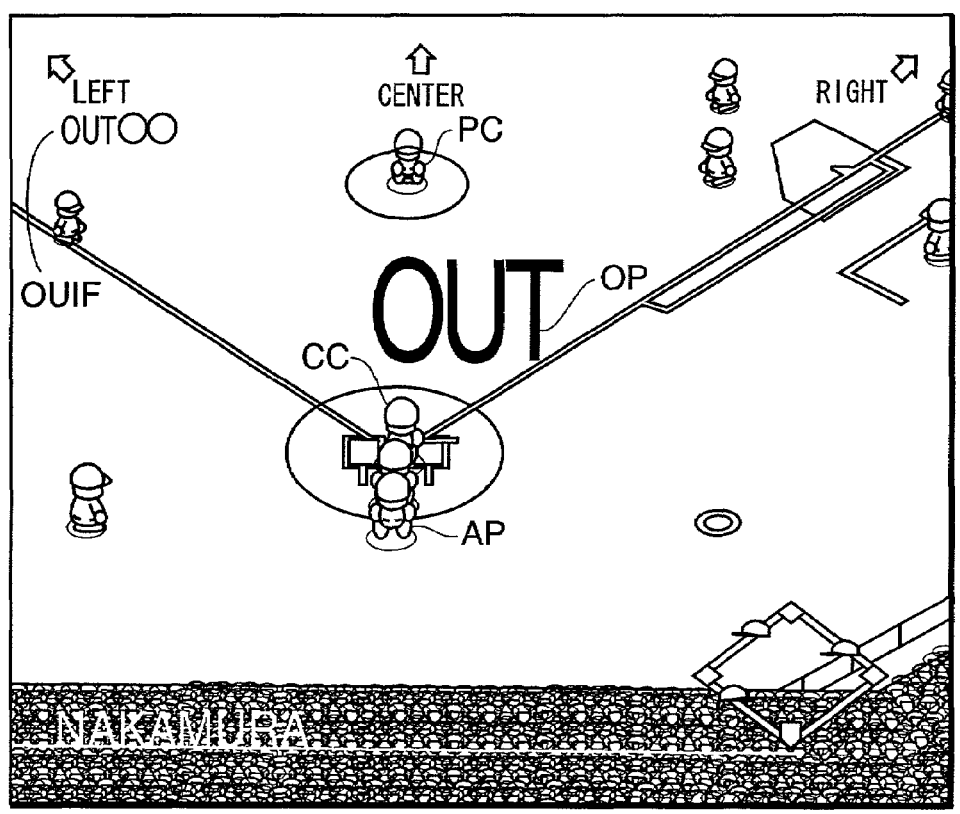
FIG. 13 shows the out screen that is displayed on the monitor of the game system.
Figure 14:
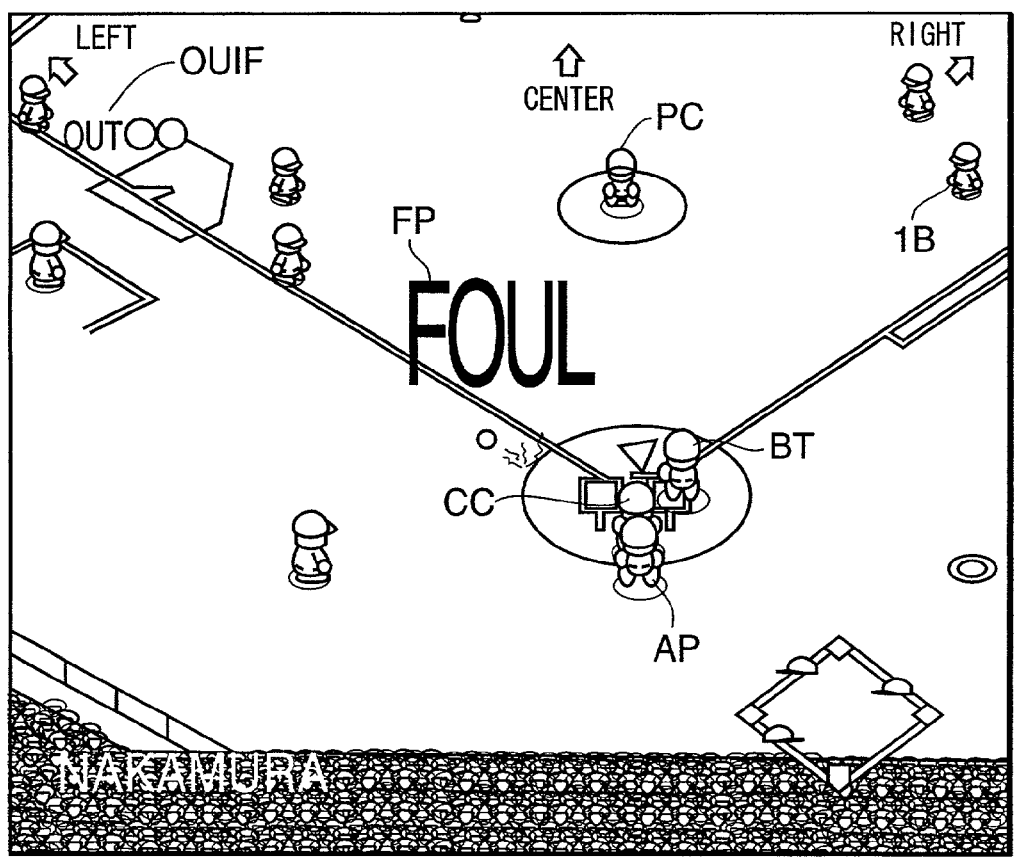
FIG. 14 shows the foul screen that is displayed on the monitor of the game system.

In cases where it is judged in step ST23 that the hit is not "fair", a judgment as to whether or not the hit is an "out" is made on the basis of the movement of the ball character BA, defensive positions and the like (ST29). In cases where it is judged that the hit is an "out" in step ST29, the out screen shown in FIG. 13 is displayed (ST31), and the processing is returned. In the out screen, an out display OP indicating that the current result was an "out" is displayed in the center of the screen, and the current out count (i.e., the out count that has been counted up by 1 in accordance with the current result) is displayed in the out count display part OUIF on the upper left portion of the screen. In cases where it is judged that the hit is not an "out" in step ST29, a judgment is made as to whether or not the current count of the strike counter is "2" (ST33). In cases where the count of the strike counter is "2" (i.e., in the case of a three-bunt failure), the processing proceeds to step ST31. In cases where the count of the strike counter is not "2", the strike counter is caused to count up ("1" is added) (ST35), the foul screen shown in FIG. 14 is displayed as being representative of a strike (ST37), and the processing is returned. In the foul screen, a foul display FP which indicates that the current result was a "foul" is displayed in the center of the screen, and the current out count is displayed in the out count display part OUIF on the upper left portion of the screen.

Next, the processing that is performed in a case where hitting is selected in step ST3 will be described with reference to the flow chart shown in FIG. 3, and the display screens shown in FIGS. 4, 12 through 14, and FIGS. 17 through 19. In a case where hitting is selected, the pitching action of the pitcher character PC is initiated in a state in which the competition screen shown in FIG. 4 is displayed on the monitor 18 (ST105). Next, an operation that alters the position of the meet cursor MC is performed by the player using the abovementioned pointing device such as a mouse or the like (ST107). Here, the alteration of the position of the meet cursor MC is accomplished by the moving operation of the pointing device such as a mouse or the like, and the direction of movement and amount of movement of the meet cursor MC are determined in accordance with the direction of movement and amount of movement of the pointing device such as a mouse or the like. Accordingly, the player can move the meet cursor MC in the desired direction and at the desired speed. Furthermore, the position of the meet cursor MC at the time of the swing is used in the judgment of a "hit" (described later) and in the calculation of the travel distance (or strength of the hit) and flying (or rolling) direction of the ball character BA. Furthermore, the size of the meet cursor MC varies according to the ability parameters of the batter character BT. Specifically, in cases where a batter character BT with high ability parameters is batting, a large meet cursor MC is displayed, while in cases where a batter character BT with low ability parameters is batting, a small meet cursor MC is displayed.

Next, the "hit" of the ball character BA and bat character YB is judged according to a timing judgment as to whether or not the swinging action of the batter character BT designated by the player was performed with the same timing as the timing at which the ball character BA pitched by the pitcher character PC passed over home base HB, and a position judgment which is a judgment of the degree of coincidence between the position of the meet cursor MC and the position of the ball character BA at this timing (ST111). Here, the operation whereby the player designates the swinging action of the batter character BT is accomplished by the button operation (e. g., clicking of the left button) of the abovementioned pointing device such as a mouse or the like.

Next, the method used to judge a "hit" is step ST111 will be described. In the abovementioned timing judgment, the presence or absence of a "hit" is judged according to whether or not the player performed an operation designating a swinging action within a specified time period before and after the timing at which the ball character BA passed over home base HB. Specifically, in cases where the player performed an operation designating a swinging action within this specified time period, the result of the action is judged to be a "hit", while in cases where the player performed an operation designating a swinging action outside the abovementioned specified time period, the result of the action is judged not to be a "hit". Meanwhile, in the abovementioned position judgment, the presence or absence of a "hit" is judged according to whether or not the ball character BA passed through the substantially elliptical range of the meet cursor MC with the same timing as the timing at which the ball character BA passed over home base HB. Specifically, in cases where the ball character BA passed through the substantially elliptical range of the meet cursor MC, the result is judged to be a "hit", while in cases where the ball character BA passed outside the substantially elliptical range of the meet cursor MC, the result is judged not to be a "hit". Then, in step ST111, the result is judged to be a "hit" in cases where this result was judged to be a "hit" according to the abovementioned timing judgment, and was also judged to be a "hit" according to the abovementioned position judgment. In all other cases, the result is judged not to be a "hit".

Figure 17:
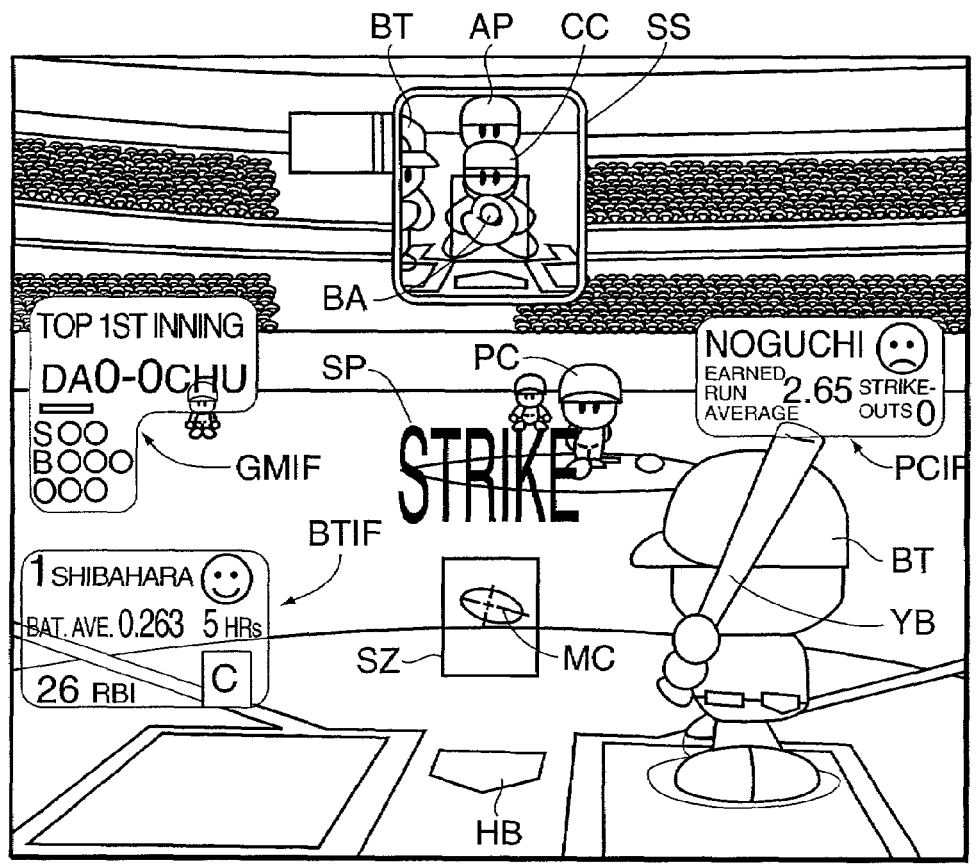
FIG. 17 shows the strike screen (hitting) that is displayed on the monitor of the game system.

In cases where the result is judged not to be a "hit" in step ST111, a judgment is made as to whether or not the current count of the strike counter is "2" (ST113). In cases where the count of the strike counter is "2", the processing proceeds to step ST131. In cases where the count of the strike counter is not "2", the strike counter is caused to count up ("1" is added) (ST117), the strike screen (hitting) shown in FIG. 17 is displayed (ST119), and the processing is returned. In the strike screen (hitting), a strike display SP indicating that the current result was a "strike" is displayed in the center of the screen.

In cases where it is judged that the result is not a "hit" in step ST111, a calculation of whether the motion of the ball character BA that struck the bat character YB is a flying motion (fly) or rolling motion (grounder), and a calculation of the strength of this flying motion (or rolling motion), are performed according to the position within the substantially elliptical range of the meet cursor MC through which the ball character BA passed with the same timing as the timing at which the ball character BA passed over home base HB. Furthermore, the timing at which the ball character BA passed over home base HB and the timing with which the player performed an operating designating a swinging action are compared, and the direction of the flying motion (or rolling motion) of the ball character BA is calculated (ST121).

In concrete terms, the travel distance (or strength of the hit) increases with a decrease in the distance between the center of the ball character BA and the center of the meet cursor MC (i.e., the center of the cross-shape marks in the meet cursor MC). In cases where the center of the ball character BA is above the lateral line of the cross-shape marks in the meet cursor MC, the result is judged to be a "fly", while in cases where the center of the ball character BA coincides with the lateral line of the cross-shape marks in the meet cursor MC or is below this lateral line, the result is judged to be a "grounder". Furthermore, in regard to the direction of the hit, in cases where (for example) the batter character BT is right-handed, the direction of the hit is toward the center if the timing at which the ball character BA passes over home base HB and the timing with which the player performs an operation designating a swinging action coincide. On the other hand, in cases where the timing with which the player performs an operation designating a swinging action is earlier than the timing at which the ball character BA passes over home base HB, the direction of the hit is toward the left side, and in cases where the timing with which the player performs an operation designating a swing-ing action is later than the timing at which the ball character BA passes over home base HB, the direction of the hit is toward the right side.

Figure 18:
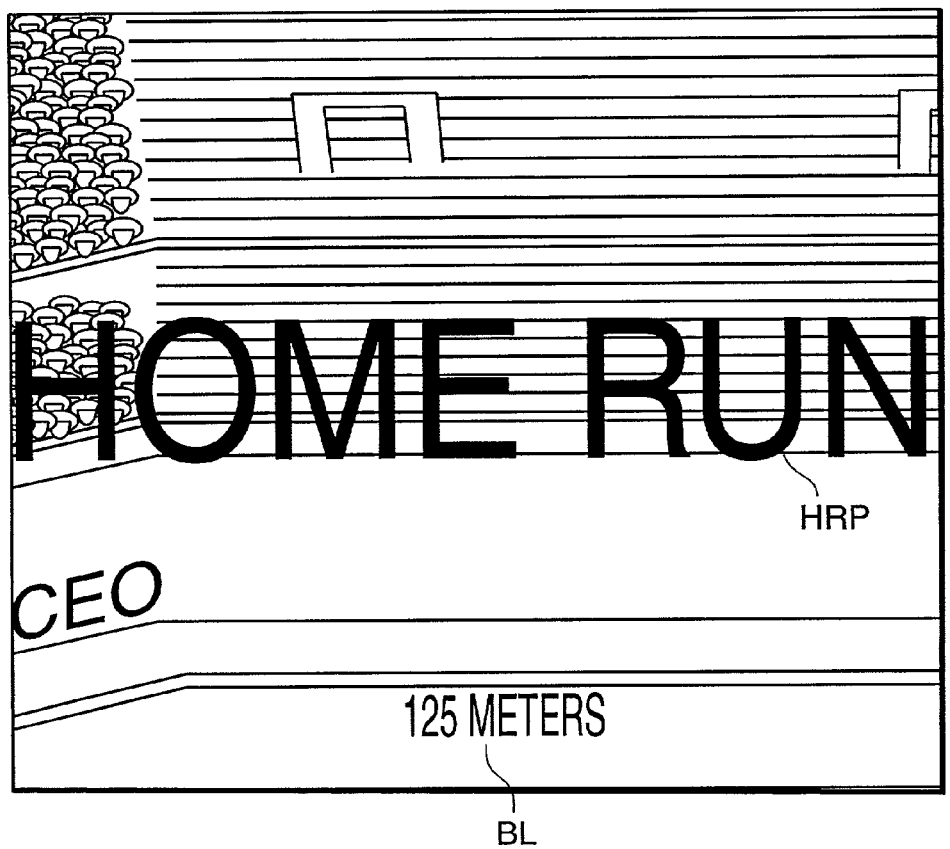
FIG. 18 shows the home run screen that is displayed on the monitor of the game system.

Next, a judgment as to whether or not the hit is "fair" is made on the basis of the direction of the flying motion (or rolling motion) of the ball character BA calculated in step ST121 (ST123). Furthermore, the judgment as to whether or not the hit is "fair" that is made in step ST123 is accomplished by utilizing a comparison of coordinates indicating the ground of the game which has boundary lines between the "fair ground" and "foul ground" with the direction of the flying motion (or rolling motion) of the ball character BA. In cases where a judgment of "fair" is made in step ST123, a judgment as to whether or not the hit is an "out" is made on the basis of the movement of the ball character BA, defensive positions and the like (ST125). Furthermore, a configuration in which the ability parameters of the batter character BT affect the judgment as to whether or not the hit is an "out" may also be used. In cases where it is judged in step ST125 that the hit is not an "out", a judgment is made as to whether or not the hit is a home run (ST139). In cases where it is judged in step ST139 that the hit is a home run, the home run screen shown in FIG. 18 is displayed (ST141), and the processing is returned. In the home run screen, a home run display HRP indicating that the current result was a "home run" is displayed in the center of the screen, and the travel distance is displayed in a travel distance display BL in the lower central portion of the screen. In cases where it is judged in step ST139 that the hit is not a home run, the hit screen shown in FIG. 12 is displayed (ST143), and the processing is returned. Meanwhile, in cases where it is judged that the hit is an "out" in step ST125, the processing proceeds to step ST131.

In cases where it is judged that the hit is not "fair" in step ST123, a judgment as to whether or not the hit is an "out" is made on the basis of the movement of the ball character BA, defensive positions and the like (ST129). In cases where it is judged that the hit is an "out" in step ST129, the out screen shown in FIG. 13 is displayed (ST131), and the processing is returned. In cases where it is judged in step ST129 that the hit is not an "out", a judgment is made as to whether or not the current count of the strike counter is "2" (ST133). In cases where the count of the strike counter is "2", the processing proceeds to step ST137. In cases where the count of the strike counter is not "2", the strike counter is caused to count up ("1" is added) (ST135), the foul screen shown in FIG. 14 is displayed (ST137), and the processing is returned.

Figure 3:
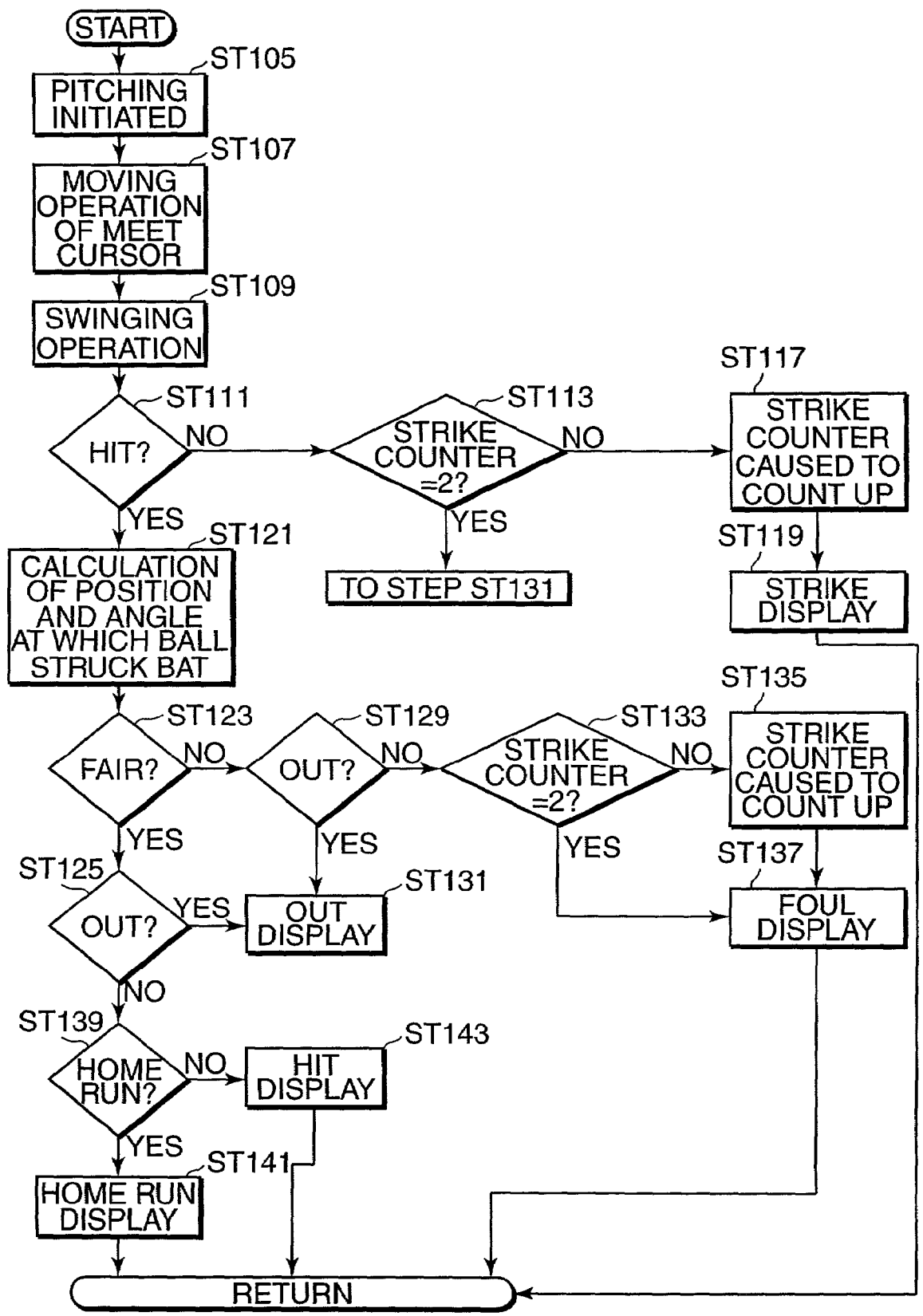
FIG. 3 is a flow chart, which is used to illustrate the operation of the game system.
Figure 15:
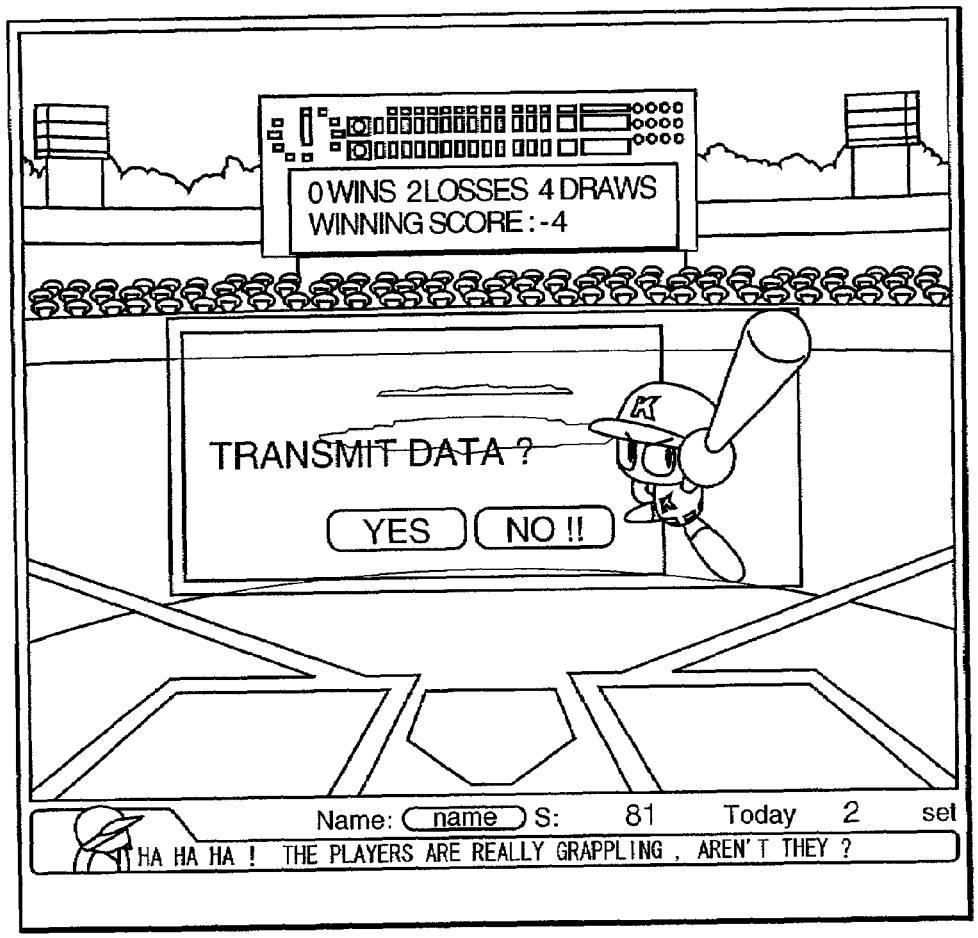
FIG. 15 shows the data transmission screen that is displayed on the monitor of the game system.

Thus, the baseball game proceeds according to the flow charts shown in FIGS. 2 and 3 as described above, and when 9 innings are completed (when the table for 9 innings ends in a case where the final offensive team is winning), a data transmission screen of the type shown in FIG. 15 is displayed. Here, if the "yes" button is clicked, the contents of the game results (i.e., the "winning score" of the player's team), the contents of pitching results such as the number of times that pitching was performed by the pitcher characters PC of the player's team, the earned run averages of these pitcher characters PC and the like, and the contents of batting results such as the batting averages, numbers of home runs and the like of the batter characters BT of the player's team, are transmitted to the server 16 from the computer 14.

Furthermore, the "winning score" of the player's team, the pitching results for the pitcher characters PC of the player's team, the batting results for the batter characters BT of the player's team and the like are calculated beforehand on the side of the computer 14; here, however, the storage of such data is handled by the server 16.

In the server 16, meanwhile, the "winning score" data transmitted from the respective computers 14 is stored in the memory unit 42, and (for example) a ranking is performed by tabulating the data in weekly units or monthly units. The ranking results are transmitted to the respective computers 14, either automatically or in response to requests from the players.

Figure 16:
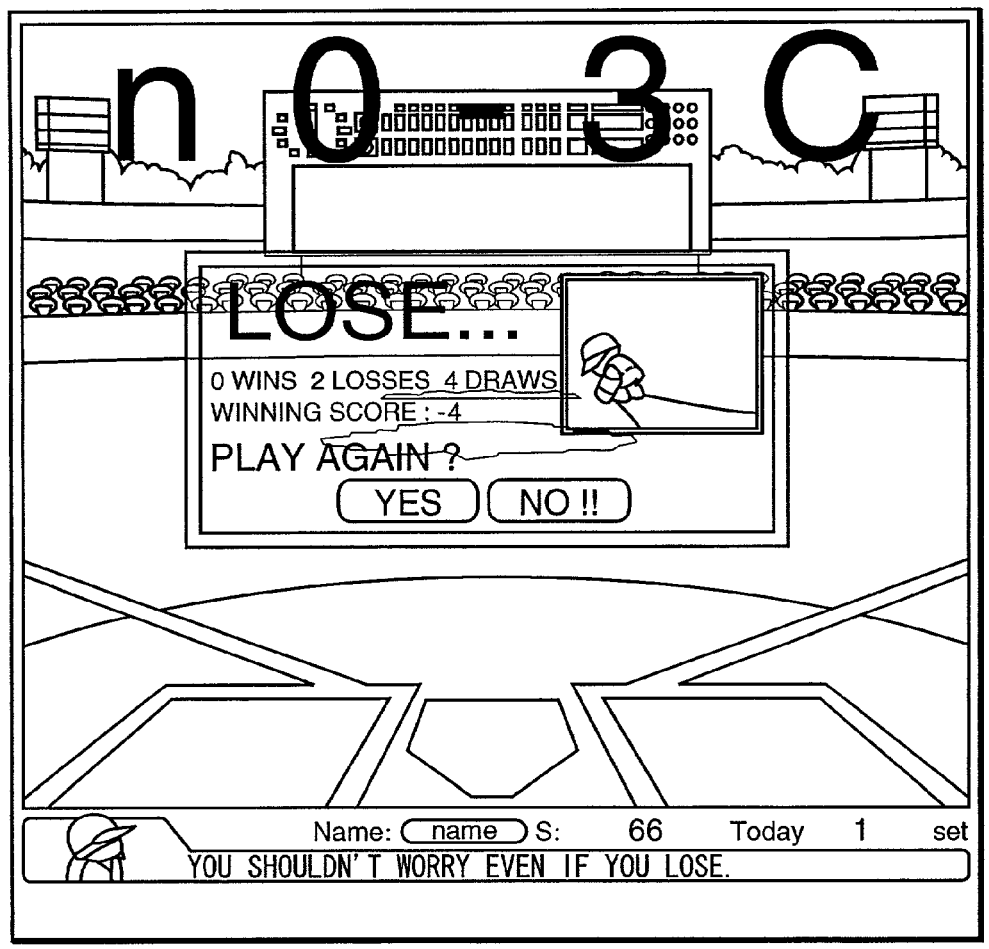
FIG. 16 shows the game continuation screen that is displayed on the monitor of the game system.

Furthermore, a game continuation screen such as that shown in FIG. 16 is displayed prior to the display of the data transmission screen, and an inquiry is made as to whether or not the player wishes to continue and play the game again. If "yes" is selected, the game can be replayed; if "no" is selected, the game ends. In cases where the player lost the preceding game, "LOSE" is displayed, in cases where the player won, "WIN" is displayed, and in cases where the game was a draw, "DRAW" is displayed.

Thus, in the present embodiment, the player can control the actions of the batter character BT by means of a mouse 22 while playing a baseball game. Accordingly, even in the case of a ball character BA which is thrown in various types of pitches and at various ball speeds, the player can react quickly to these variations, so that the player can perform batting (including bunting) accurately in desired positions. Furthermore, since computers 14 which have a broad user stratum are used, and the system is devised so that the results of baseball games played using respective computers 14 on the basis of a competition program that is distributed directly or indirectly from a server 16 are controlled in a concentrated manner by the server 16, with rankings being displayed as a result, a game environment that allows the participation of numerous persons can easily be constructed. Furthermore, since persons participating in the baseball game can easily understand their own results relative to the overall group, an incentive for continuing the game can be provided. Moreover, since competition values are obtained in cases where certain fixed conditions are met, this also provides an incentive for continuing the game.

Furthermore, the present invention may also adopt the following configurations:

(A) In the present embodiment, a case in which a mouse 22 was used as the pointing device was described. However, a configuration using a portable tracking ball, portable slide pad or similar pointing device which allows the simultaneous input of the direction of displacement and amount of displacement of a pointer by means of a single operation performed by the player, and which allows the input of signals at the same timing as that of this operation, may also be used.

(B) In the present embodiment, a case in which bunting was selected when the left and right buttons of the mouse were simultaneously pressed as described; however, a configuration in which this selection is performed by some other button operation of a pointing device such as a mouse or the like, such as clicking the right button or clicking the left button of the mouse, is also possible.

(C) In the present embodiment, the range of vertical immovability of the bat character in a case where bunting was selected was set as a range extending from the lower end of the strike zone to the upper end of the strike zone; however, a configuration in which a broader range is set as this range of immovability is also possible. In this case, the operations of the player are reflected in the game to a greater degree, so that the interest of the game is heightened.

(D) In the present embodiment, the system was set so that the direction of the bunt in cases where bunting was selected could be altered through a range extending from a specified portion of the foul zone on the third base side to a specified portion of the foul zone on the first base side, on either side of the fair zone. However, a configuration in which the direction of the bunt can be varied through an even broader range (e. g., a range of ±90 degrees centered on the direction from home base to the pitcher character) is also possible. In this case, the operations of the player are reflected in the game to a greater degree, so that the interest of the game is heightened.

(E) In the present embodiment, the judgment of a "hit" in cases where bunting was selected was accomplished by comparing the height at which the ball character passed over home base and the height of the axial center of the bat character. However, a configuration in which this judgment is made with the ability parameters of the batter character also being taken into account is also possible. In this case, the bunt success rate is affected by the ability parameters of the batter character; accordingly, the interest of the game is heightened.

(F) In the present embodiment, the operation concerning the direction of bunting and movement of the bat character in the vertical direction in cases where bunting was selected was received after the pitcher character had initiated pitching; however, a configuration in which this operation is received in an ordinary manner when bunting is selected is also possible.

(G) In the present embodiment, the server and personal computers were connected; however, a configuration in which the personal computers are in a stand-alone state is also possible. In such cases, there is no need for a server or data transfer.

Figure 19:
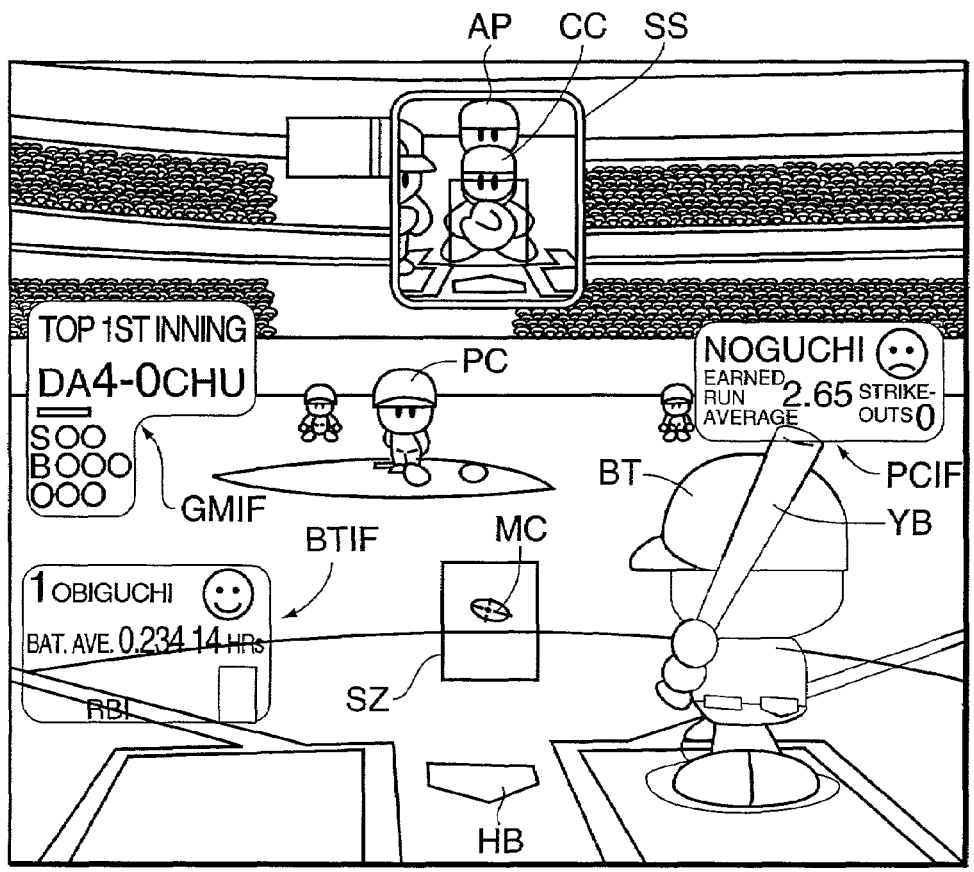
FIG. 19 shows the competition screen that is displayed on the monitor of the game system (in the case of selection of a strong swing).

(H) In the present embodiment, a case was described in which the size of the meet cursor displayed during hitting varied according to the ability parameters of the batter character. However, a configuration in which the size of the meet cursor also varies according to whether or not the player selects the "strong swing" that is used when aiming at a home run is also possible. In such a case, for example, the system is devised so that the selection of a "strong swing" is accomplished by the clicking operation of the right button of the abovementioned pointing device such as a mouse or the like, and in cases where this "strong swing" is selected, the size of the meet cursor is reduced as shown in FIG. 19. In this case, since a "strong swing" can be selected, the interest of the game is heightened.

In summary, this invention relates to a computer readable recording medium in which a game progress control program is recorded to control a progress of a baseball game in which a game player's team and a computer-controlled team or competitor's team alternately play offense and defense via a ball character used as a game medium, said game progress control program comprising the steps of: displaying a game image including a plurality of characters on a monitor screen of a computer; receiving input of contents of instructions based on a moving operation and a button operation made by the game player on a pointing device; and proceeding a baseball game based on the input made by the game player; wherein in said receiving step, the designation of instructions for the pitching action of a pitcher character is accomplished by the operation of said pointing device when the game player's team is the defensive side, designation of instructions for the offensive action of a batter character is accomplished by the operation of said pointing device when the game player's team is the offensive side, and a selection of bunting or hitting as said offensive action is accomplished by a button operation of said pointing device.

Another aspect of the present invention relates to a game progress control method for controlling a progress of a baseball game in which a game player's team and a computer-controlled team or competitor's team alternately play offense and defense via a ball character used as a game medium, the game progress control method comprising the steps of: displaying a game image including a plurality of characters on a monitor screen of a computer; receiving input of contents of instructions based on a moving operation and a button operation made by the game player on a pointing device; and proceeding a baseball game based on the input made by the game player; wherein in said receiving step, the designation of instructions for a pitching action of a pitcher character is accomplished by the operation of said pointing device when the game player's team is the defensive side, designation of instructions for the offensive action of a batter character is accomplished by the operation of said pointing device when the game player's team is the offensive side, and a selection of bunting or hitting as said offensive action is accomplished by a button operation of said pointing device.

In the abovementioned inventions, the game proceeds with the player's team and the computer-controlled team or competitor's team alternately playing offense and defense via a ball character used as the game medium. When the player's team is the defensive side, the pitching action of the pitcher character is accomplished by operating the abovementioned pointing device, and when the player's team is the offensive side, the offensive action of the batter character is accomplished by operating the abovementioned pointing device. Accordingly, a baseball game can be realized in an environment that is difficult to achieve in the case of a game-dedicated device and joystick used in such a device. Furthermore, since the selection of bunting or hitting as the abovementioned offensive action is accomplished by operating the button of the abovementioned pointing device, the offensive action is diversified so that the ability to plan the game is improved.

In the aforementioned computer readable recording medium, it is preferable that said pointing device has at least two buttons including a first button and a second button, and said selection of bunting or hitting is accomplished by performing different button operations on said first button and second button.

In the abovementioned game progress control program, the selection of bunting or hitting is accomplished by performing different button operations with respect to the first button and second button; accordingly, the selection of bunting or hitting can be accomplished quickly and easily, so that the ability to plan the game is improved.

In the game progress control program, the designation of instructions for alteration of a height and an orientation of the bat character can be set to be accomplished by the moving operation of said pointing device in cases where bunting is selected as the offensive action of said batter character.

With the above feature, the selection of bunting or hitting is accomplished by different button operations with respect to a first button and second button; accordingly, the selection of bunting or hitting can be accomplished quickly and easily, so that the ability to plan the game is improved. Furthermore, the alteration of the height and orientation of the bat character is accomplished by the moving operation of the pointing device; accordingly, the height and orientation of the bat character can be altered at the speed desired by the player, so that the ability to plan the game is further enhanced.

In the game progress control program, wherein the operation regarding the alteration of the height and the orientation of said bat character is preferably received after the pitching action of the pitcher character is initiated.

With the above feature, since the operation regarding the alteration of the height and orientation of the abovementioned bat character is received after the pitching action of the pitcher character is initiated, the timing of the operation of the abovementioned alteration is restricted, so that the tension of the player is heightened.

In the game progress control program, wherein the degree of success of the batting action is preferably judged in accordance with the degree of overlap of said bat character and said ball character and the orientation of said bat character when said bunting is selected.

In the game progress control program, since the degree of success of the batting action is judged in accordance with the degree of overlap of the bat character and ball character and the orientation of the bat character in cases where bunting is selected, a game which is rich in terms of reality can be developed.

In the game progress control program, it may further comprise the steps of setting parameters that define abilities for each batter character of said game player's team, and changing these parameters in accordance with said batting results and said pitching results. In the invention described above, the ability of the batter character can be set and altered by altering parameters in accordance with the batting results, and the ability of the pitcher character can be set and altered by altering parameters in accordance with the pitching results. Accordingly, the baseball game is rich in Another aspect of the present invention relates to a game server which can be accessed from a computer operated by the player via a network, and which has a computer readable recording medium on which the game progress control program according to any one of the aforementioned paragraphs. The abovementioned server makes it possible to enjoy a baseball game using the game progress control program rich in interest This application is based on Japanese Patent Application Serial No. 2001-025989 filed in Japanese Patent Office on Feb. 01, 2001, the contents of which are hereby incorporated by reference.

Although the present invention has been fully described by way of drawings, it is to be understood that various changes and modifications will be apparent from to those skilled in the art. Therefore, unless otherwise such changes and modifications depart from the scope of the present invention hereinafter defined, they should be construed as being included therein.

What is claimed is:

1. A computer readable recording medium in which a game progress control program is recorded to control a progress of a baseball game in which a game player's team and a computer-controlled team or competitor's team alternately play offense and defense via a ball character used as a game medium, said game progress control program allows a computer to perform the steps comprising:
  displaying a game image including a plurality of characters, a bat character and a strike zone on a monitor screen of a computer;

receiving input of contents of instructions based on a moving operation and a button operation made by the game player on a pointing device, wherein in said receiving step:

designation of instructions for a pitching action of a pitcher character is accomplished by the operation of said pointing device when the game player's team is the defensive side;

designation of instructions for an offensive action of a batter character is accomplished by the operation of said pointing device when the game player's team is the offensive side, a selection of bunting or hitting as said offensive action is accomplished by a button operation of said pointing device, and designation of instructions for bunting for both:

alteration of a height of the bat character from one displayed position to another displayed position within an area defined by an upper limit and a lower limit of the strike zone; and an orientation of the bat character;

is accomplished singly by the moving operation of said pointing device based on a moving amount and a moving direction of the pointing device in cases where bunting is selected as the offensive action of said batting character;

displaying a corresponding vertical movement effecting movement of the bat character from said one displayed position to said another displayed position within the strike zone displayed on the monitor screen according to the received instructions regarding the alteration of the height of the bat character; and progressing a baseball game based on the input made by the game player.

2. The computer readable recording medium according to claim 1, wherein said pointing device has at least two buttons including a first button and a second button, and said selection of bunting or hitting is accomplished by performing different button operations on said first button and second button.

3. The computer readable recording medium according to claim 1, wherein the operation regarding the alteration of the height and the orientation of said bat character is received after the pitching action of the pitcher character is initiated.

4. The computer readable recording medium according to claim 1, wherein the degree of success of a batting action is judged in accordance with the degree of overlap of said bat character and said ball character and the orientation of said bat character when said bunting is selected.

5. The computer readable recording medium according to claim 1, further comprising the steps of setting parameters that define abilities for each batter character of said game player's team, and changing said parameters in accordance with batting results and pitching results.

6. The computer readable recording medium according to claim 1, wherein:

said pointing device is a mouse; and said receiving input of contents of instructions are based on a moving operation and a button operation made by the game player on said mouse, wherein in said receiving step, said designation of instructions for said pitching action of said pitcher character is accomplished by the operation of said mouse when the game player's team is the defensive side said designation of instructions for said offensive action of said batter character is accomplished by the operation of said mouse when the game player's team is the offensive side, and said selection of bunting or hitting as said offensive action is accomplished by said button operation being performed on said mouse.

7. A computer readable recording medium according to claim 1, wherein:

said displaying said game image includes displaying a contact position cursor, wherein the contact position cursor indicates a position through which a bat swing is calculated;

said pointing device is a mouse having at least two buttons including a first button and a second button;

said receiving includes:

said designation of instructions for the offensive action of the batter character being accomplished by the operation of said mouse when the game player's team is the offensive side, and said selection of bunting or hitting as said offensive action being accomplished by the operation of said mouse, and designation of instructions for hitting for alteration of a position of the contact position cursor from one displayed position to another displayed position within an area defined by an upper limit and a lower limit of the strike zone being accomplished by a single moving operation of said mouse, including both a moving amount and a moving direction, when the game player's team is the offensive side in such manner that the direction of movement and the amount of movement of the contact position cursor are determined in accordance with the direction and amount of movement corresponding to the single operation of the mouse; and said displaying includes displaying a corresponding movement of the contact position cursor from said one displayed position to said another displayed position within the strike zone displayed on the monitor screen according to the received instruction regarding the alteration of the position of the meet cursor.

8. The computer readable recording medium according to claim 1, the program further comprising the step of displaying an arrow above the bat character indicating a direction of a bunt executed by said offensive action.

9. The computer readable recording medium according to claim 8, the program further comprising the step of displaying the bat character moving at a speed proportional to a speed of the moving operation.

10. The computer readable recording medium according to claim 9, the program further comprising the step of displaying the bat character moving at a speed proportional to a speed of the moving operation.

11. The computer readable recording medium according to claim 7, wherein a size of the contact position cursor, displayed on the monitor, varies according to an ability parameter of the batter character.

12. The computer readable recording medium according to claim 1, wherein:

said displaying said game image includes displaying a contact position cursor, wherein the contact position cursor indicates a position through which a bat swing is calculated;

said receiving includes:

designation of instructions for hitting for alteration of a position of the contact position cursor from one displayed position to another displayed position within an area defined by an upper limit and a lower limit of the strike zone being accomplished by a single moving operation of said pointing device, including both a moving amount and a moving direction, when the game player's team is the offensive side in such manner that the direction of movement and the amount of movement of the contact position cursor are determined in accordance with the direction and amount of movement corresponding to the single operation of the pointing device;

said displaying includes displaying a corresponding movement of the contact position cursor from said one displayed position to said another displayed position within the strike zone displayed on the monitor screen according to the received instruction regarding the alteration of the position of the meet cursor.

13. The computer readable recording medium according to claim 12, wherein said pointing device inputs the movement direction over a substantially continuous range.

14. The computer readable recording medium according to claim 13, wherein a size of the contact position cursor, displayed on the monitor, varies according to an ability parameter of the batter character.

15. The computer readable recording medium according to claim 12, wherein a size of the contact position cursor, displayed on the monitor, varies according to an ability parameter of the batter character.

16. The computer readable recording medium according to claim 15, the program further comprising the step of displaying a small screen in an upper center screen portion displaying a side of the batter character from a viewpoint of the pitcher character.

17. The computer readable recording medium according to claim 1, the program further comprising the step of displaying a small screen in an upper center screen portion displaying a side of the batter character from a viewpoint of the pitcher character.

18. A game server which can be accessed from a computer operated by a game player via a network, said game server including a computer readable recording medium which records a game progress control program to control a progress of a baseball game in which and a game player's team and a computer-controlled team or competitor's team alternately play offense and defense via a ball character used as a game medium, said game progress control program allows a computer to perform the steps comprising:

displaying a game image including a plurality of characters, a bat character and a strike zone on a monitor screen of a computer;

receiving input of contents of instructions based on a moving operation and a button operation made by the game player on a pointing device, wherein in said receiving step:

designation of instructions for a pitching action of a pitcher character is accomplished by the operation of said pointing device when the game player's team is the defensive side;

designation of instructions for an offensive action of a batter character is accomplished by the operation of said pointing device when the game player's team is the offensive side, a selection of bunting or hitting as said offensive action is accomplished by a button operation of said pointing device, and designation of instructions for bunting for both:

alteration of a height of the bat character from one displayed position to another displayed position within an area defined by an upper limit and a lower limit of the strike zone; and an orientation of the bat character;

is accomplished singly by the moving operation of said pointing device based on a moving amount and a moving direction of the pointing device in cases where bunting is selected as the offensive action of said batting character;

displaying a corresponding vertical movement effecting movement of the bat character from said one displayed position to said another displayed position within the strike zone displayed on the monitor screen according to the received instructions regarding the alteration of the height of the bat character; and progressing a baseball game based on the input made by the game player.

19. A game progress control method for controlling a progress of a baseball game in which a game player's team and a computer-controlled team or competitor's team alternately play offense and defense via a ball character used as a game medium, the game progress control method comprising the steps of:

displaying a game image including a plurality of characters, a bat character and a strike zone on a monitor screen of a computer;

receiving input of contents of instructions based on a moving operation and a button operation made by the game player on a pointing device, wherein in said receiving step:

designation of instructions for a pitching action of a pitcher character is accomplished by the operation of said pointing device when the game player's team is the defensive side;

designation of instructions for an offensive action of a batter character is accomplished by the operation of said pointing device when the game player's team is the offensive side, a selection of bunting or hitting as said offensive action is accomplished by a button operation of said pointing device, and designation of instructions for bunting for both:

alteration of a height of the bat character from one displayed position to another displayed position within an area defined by an upper limit and a lower limit of the strike zone; and an orientation of the bat character;

is accomplished singly by the moving operation of said pointing device based on a moving amount and a moving direction of the pointing device in cases where bunting is selected as the offensive action of said batting character;

displaying a corresponding vertical movement effecting movement of the bat character from said one displayed position to said another displayed position within the strike zone displayed on the monitor screen according to the received instructions regarding the alteration of the height of the bat character; and progressing a baseball game based on the input made by the game player.

20. A computer readable recording medium in which a game progress control program is recorded to control a progress of a baseball game in which a game player's team and a computer-controlled team or competitor's team alternately play offense and defense via a ball character used as a game medium, said game progress control program allows a computer to perform the steps comprising:

displaying a game image including a plurality of characters, a bat character and a strike zone on a monitor screen of a computer;

receiving input of contents of instructions based on a moving operation and a button operation made by the game player on a mouse having at least two buttons including a first button and a second button, wherein in said receiving step:

designation of instructions for a pitching action of a pitcher character is accomplished by the operation of said mouse when the game player's team is the defensive side;

designation of instructions for an offensive action of a batter character is accomplished by the operation of said mouse when the game player's team is the offensive side, and a selection of bunting or hitting as said offensive action is accomplished by different button operations on said first and second buttons of said mouse, designation of instructions for bunting for both;

alteration of a height of the bat character of the bat character from one displayed position to another displayed position within an area defined by an upper limit and a lower limit of the strike zone; and an orientation of the bat character;

is accomplished by the moving operation, including a moving amount and a moving direction, of said mouse in cases where bunting is selected as the offensive action of said batting character;

displaying a corresponding vertical movement effecting movement of the bat character from said one displayed position to said another displayed position within the strike zone displayed on the monitor screen according to the received instructions regarding the alteration of the height of the bat character; and progressing a baseball game based on the input made by the game player.

* * * * *